(12) United States Patent
DeLine

(10) Patent No.: US 7,614,035 B2
(45) Date of Patent: Nov. 3, 2009

(54) CARTOGRAPHIC SOFTWARE MAPS

(75) Inventor: Robert A. DeLine, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 803 days.

(21) Appl. No.: 11/266,922

(22) Filed: Nov. 4, 2005

(65) Prior Publication Data

US 2007/0106975 A1  May 10, 2007

(51) Int. Cl.
    *G06F 9/44* (2006.01)
(52) U.S. Cl. .................. 717/104; 717/105; 717/109; 717/113; 717/123
(58) Field of Classification Search ................. 717/100, 717/104–105, 109, 113, 123; 702/22; 703/6, 703/22; 345/646
See application file for complete search history.

(56) References Cited

U.S. PATENT DOCUMENTS

| | | | | |
|---|---|---|---|---|
| 5,652,899 A | * | 7/1997 | Mays et al. | 715/239 |
| 5,838,973 A | * | 11/1998 | Carpenter-Smith et al. | 717/105 |
| 5,978,582 A | * | 11/1999 | McDonald et al. | 717/104 |
| 6,097,887 A | * | 8/2000 | Hardikar et al. | 717/105 |
| 6,408,430 B2 | * | 6/2002 | Gunter et al. | 717/109 |
| 6,789,054 B1 | * | 9/2004 | Makhlouf | 703/6 |
| 7,310,784 B1 | * | 12/2007 | Gottlieb et al. | 715/853 |
| 2002/0091990 A1 | * | 7/2002 | Little et al. | 717/105 |
| 2002/0138247 A1 | * | 9/2002 | Payton et al. | 703/22 |
| 2004/0125116 A1 | * | 7/2004 | Lee et al. | 345/646 |
| 2005/0066319 A1 | | 3/2005 | DeLine et al. | |
| 2005/0081192 A1 | | 4/2005 | DeLine et al. | |

OTHER PUBLICATIONS

U.S. Appl. No. 60/658,328, filed Mar. 2, 2005, Robertson et al.
Balzer et al., "Software Landscapes: Visualizing the Structure of Large Software Systems," Joint Eurographics—IEEE TCVG Symposium on Visualization, 6 pages, 2004.
Charters et al., "Visualisation for Informed Decision Making; From Code to Components," *SEKE '02*, Workshop on software engineering decision support: components, pp. 765-772, Jul. 2002.
DeLine et al., "Towards Understanding Programs through Wear-based Filtering," Software Visualization, Proceedings of the 2005 ACM symposium on Software visualization, pp. 183-192, May 2005.

(Continued)

*Primary Examiner*—Lewis A Bullock, Jr.
*Assistant Examiner*—Carina Yun
(74) *Attorney, Agent, or Firm*—Klarquist Sparkman, LLP

(57) ABSTRACT

A software program can be represented as a map depicting respective software components of the software program. A grid system can be used, and map elements can be contiguous geometric shapes. Affinity between the software components can be represented in the map, such as by placing corresponding map elements close to one other in the map. During navigation through source code, an indication of where within the source code the navigation has occurred can be displayed on the map. Paths can be shown on the map. A technique for building the map can rely on a metric of a software component when generating a corresponding map element in the software map. The map can be depicted as a geographic map to help developers locate components.

18 Claims, 26 Drawing Sheets

OTHER PUBLICATIONS

Eick et al., "Interactive Data Visualization at AT&T Bell Laboratories," Conference on Human Factors in Computing Systems, Conference companion on Human factors in computing systems, pp. 17-18, 1995.

Eick et al., "Seesoft—A Tool for Visualizing Line Oriented Software Statistics," *IEEE Transactions on Software Engineering*, vol. 18., No. 11, pp. 957-968, Nov. 1992.

Furnas, "Generalized Fisheye Views," *Human Factors in Computing Systems CHI'86 Conference Proceedings*, pp. 16-23, 1986.

Golomb, *Polyominoes*, 2d. Ed., Princeton University Press, Princeton, New Jersey, 1994.

Knight et al., "Virtual but visible software," *Information Visualization*, Proceedings of the International Conference on Information Visualization, pp. 198-205, 2000.

Marcus et al., "3D Representations for Software Visualization," Software Visualization, Proceedings of the 2003 ACM symposium on Software visualization, pp. 27-36 and 207, 2003.

Storey et al., "SHriMP Views: An Interactive Environment for Information Visualization and Navigation," Conference on Human Factors in Computing Systems, CHI '02 extended abstracts on Human factors in computing systems, pp. 520-521, 2002.

\* cited by examiner

FIG. 6A
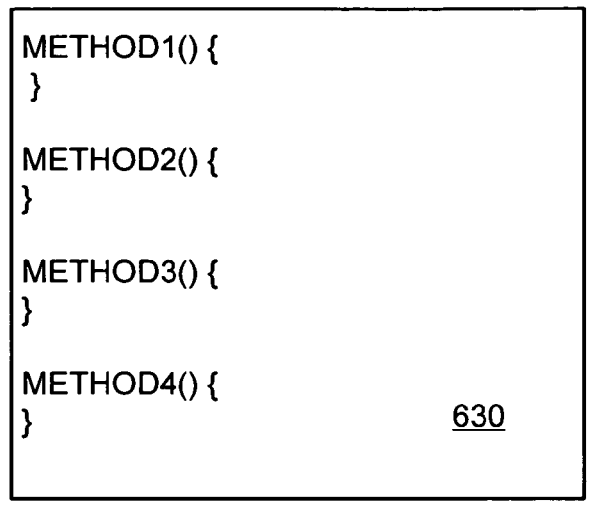
FIG. 6B
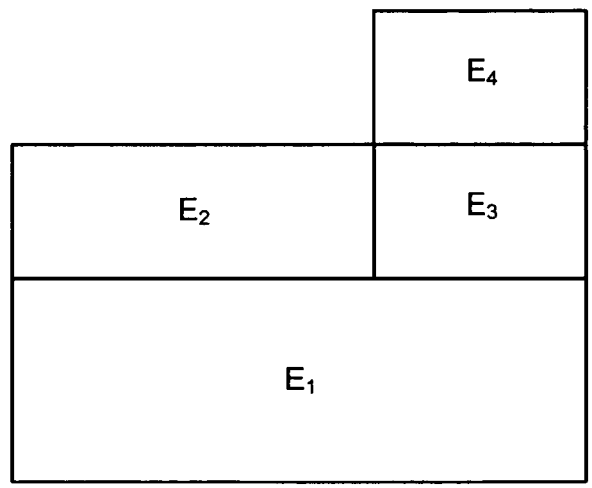

900

```
METHOD2() {
  STATEMENT;
  VAR = FUNC();
  PARAM = OBJ.METHOD(P1,P2);
  RESULT = VAR * PARAM;
  IF LOCK(RESOURCE)
     RELEASE();
}
```
930

950

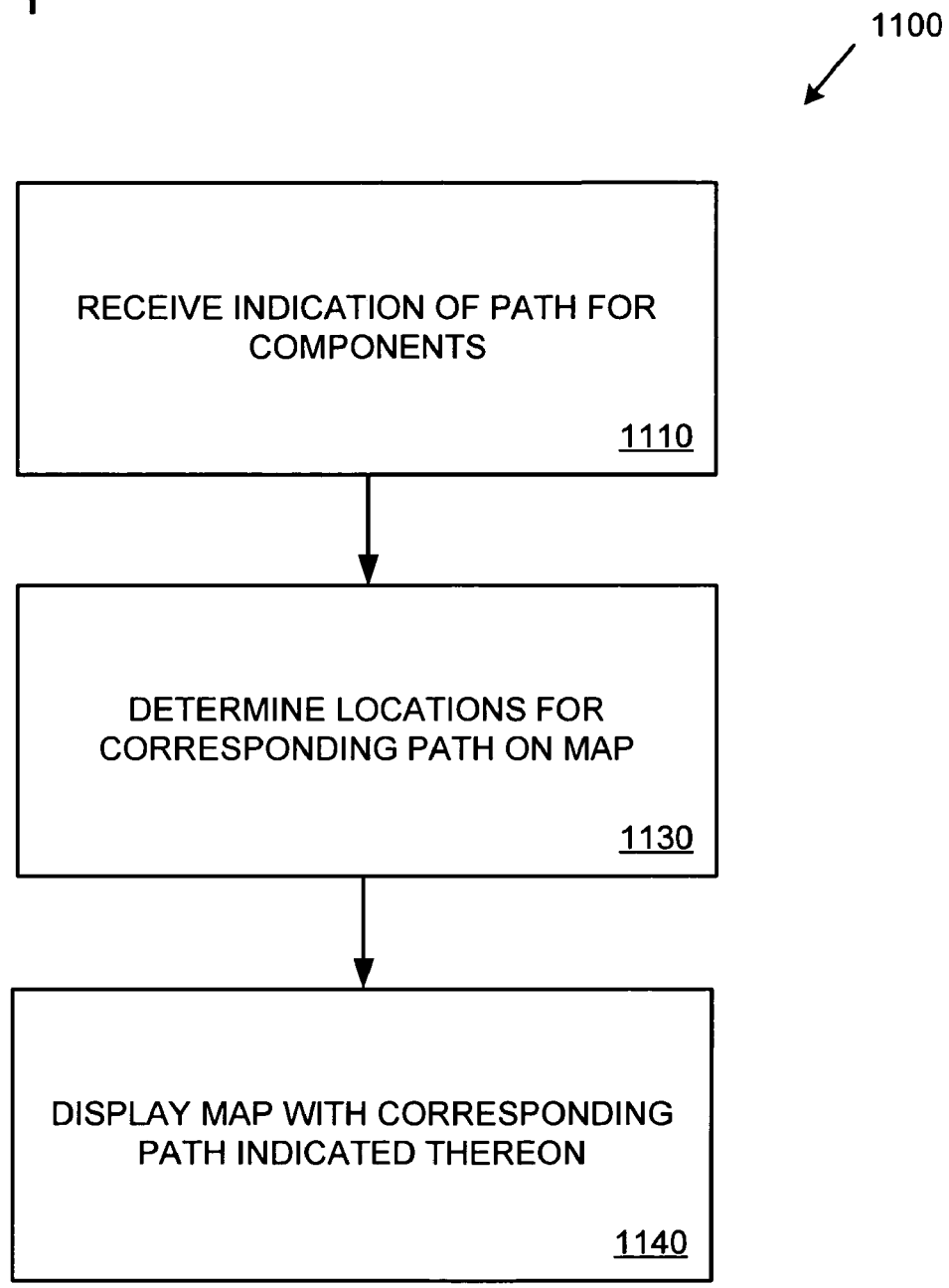

1500

MEMBERSHIP SUBSET X: METHOD 1, METHOD 2, METHOD 6
MEMBERSHIP SUBSET Y: METHOD 4, METHOD 6

1550

```
METHOD1: MAGNITUDE 8
METHOD2: MAGNITUDE 3
METHOD3: MAGNITUDE 5
METHOD4: MAGNITUDE 2
METHOD5: MAGNITUDE 2
METHOD6: MAGNITUDE 10
AFFINITY (M1,M2): HIGH
AFFINITY (M1,M3): HIGH
. . .
AFFINITY (M4, M5): LOW
```

↙ 2300

↙ 2330

↙ 2360

US 7,614,035 B2

CARTOGRAPHIC SOFTWARE MAPS

BACKGROUND

Dealing with large software programs can be challenging. For example, for a program involving a large amount of source code, it may be impossible for a developer to fathom the totality of the program and how a particular component fits within the program. Some representations of software, such as class hierarchies and UML class diagrams can be helpful.

However, such conventional approaches can break down under certain circumstances, such as if the program is particularly complex or lengthy. Better ways of dealing with software are still needed.

SUMMARY

A map can be drawn of software. For example, a map representing source code can be drawn. If desired, a current location within the software can be shown on the map. Paths and subset membership can be indicated on the map. A grid system can be used for elements on the map.

A map can be drawn based on relationships between the software components represented by the corresponding map elements. For example, affinity can be used to determine where to place map elements. A metric of a software component can determine the size of a corresponding map element.

During map construction, elements already in the map can be morphed to accommodate placement of new elements.

The foregoing and other features and advantages will become more apparent from the following detailed description of disclosed embodiments, which proceeds with reference to the accompanying drawings.

BRIEF DESCRIPTION OF THE FIGURES

FIG. 6A is an exemplary program excerpt with components, and

FIG. 6B is an exemplary corresponding map representing the program.

FIG. 11 is a flowchart showing an exemplary method of indicating a path within a map.

DETAILED DESCRIPTION

EXAMPLE 1

Exemplary System Employing a Combination of the Technologies

Figure 1:
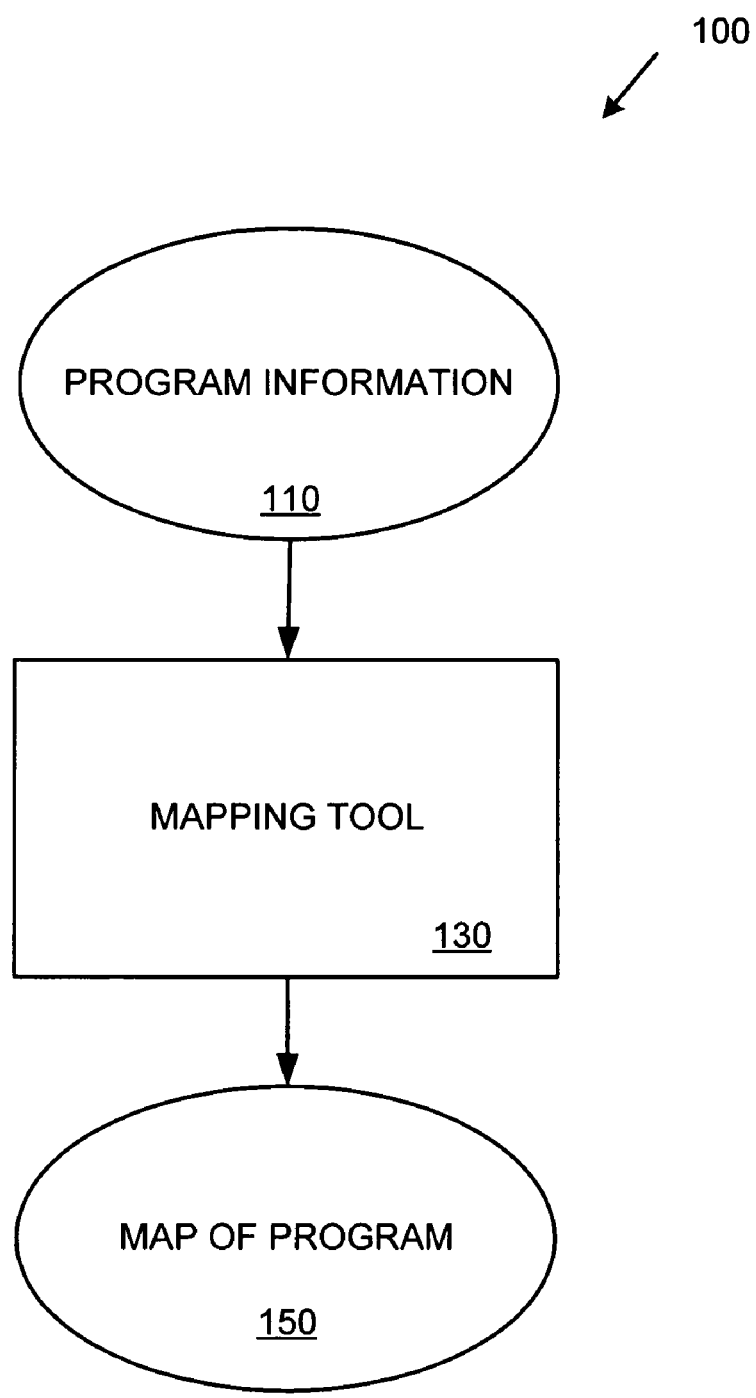
FIG. 1 is a block diagram of an exemplary system employing a combination of the technologies described herein.

FIG. 1 is a block diagram of an exemplary system 100 employing a combination of the technologies described herein. Such a system 100 can be provided separately or as part of a software development environment.

In the example, a mapping tool 130 processes software program information 110. The mapping tool 130 can generate a map 150 of the software program based on the program information 110.

In practice, the map 150 can then be stored, displayed, printed, communicated (e.g., via email), shared (e.g., by posting to a web page or file), or some combination thereof for consideration by a software developer or a software development team.

EXAMPLE 2

Exemplary Method Employing a Combination of the Technologies

Figure 2:
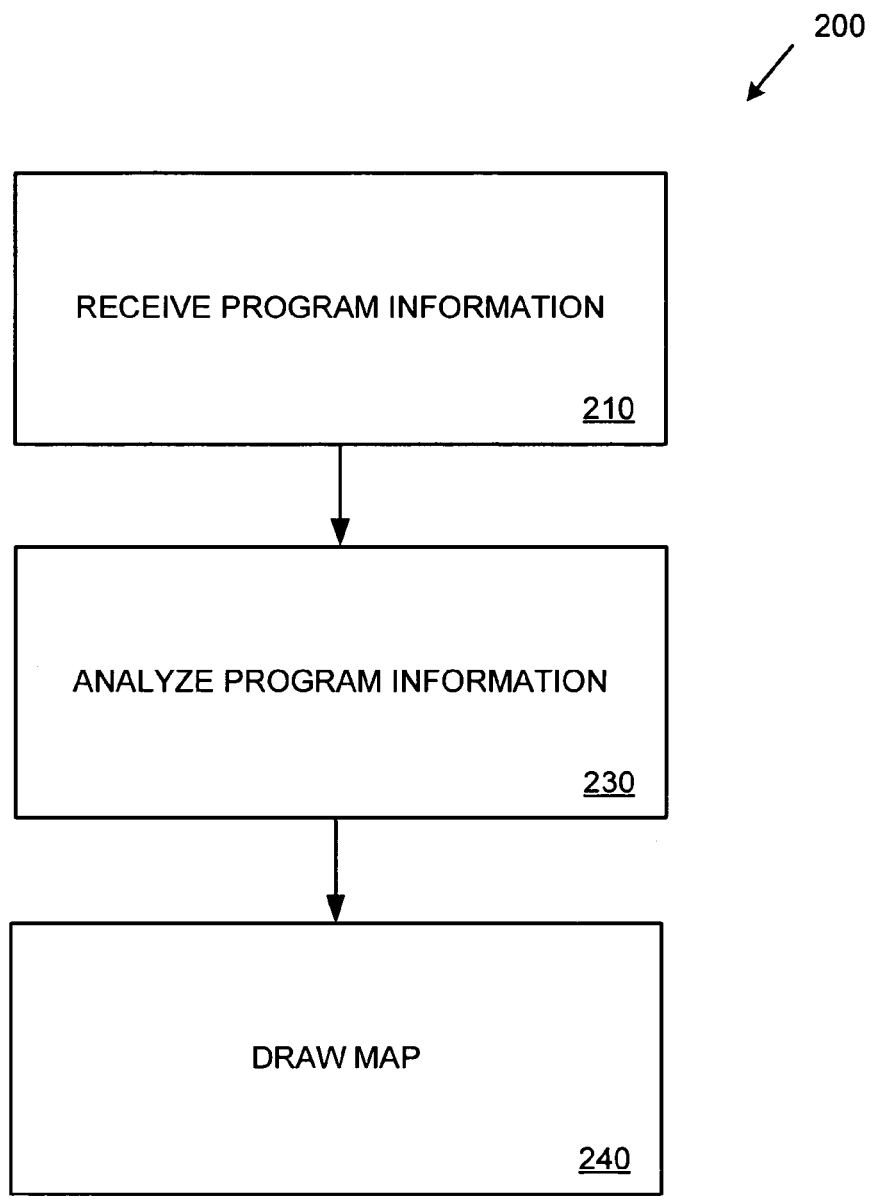
FIG. 2 is a flowchart of an exemplary method employing a combination of the technologies described herein and can be implemented in a system such as that shown in FIG. 1.

FIG. 2 is a flowchart of an exemplary method 200 employing a combination of the technologies described herein and can be implemented in a system such as that shown in FIG. 1. In the example, at 210 program information for the software program being mapped is received (e.g., by the mapping tool 110 of FIG. 1). At 230, the program information is analyzed to generate a map (e.g., map elements).

At 240, the map is drawn.

EXAMPLE 3

Exemplary Software Program Information

In any of the examples herein, software program information can include information about the components of the software. Such components can be methods, classes, program files, libraries (e.g., DLLs), and the like. As described herein, information about the components can be any of a number of metrics. For example, metrics can include number of lines of code, affinity, complexity (e.g., cyclomatic complexity), amount of execution time spent in the software component, which developer has edited the code, when the code was created, when it was last edited, when it was last changed, number of variables, number of objects, number of times a developer has viewed the component, number of times a developer has edited the component, number of times the component has crashed (e.g., during customer use), and the like.

The map can be constructed of map elements corresponding to respective software components.

EXAMPLE 4

Exemplary Software Program Maps

In any of the examples described herein, a variety of program mapping techniques can be used. For example, two-dimensional or three-dimensional depictions can be used. The map can be constructed of map elements. Such map elements can be formed from geometric shapes.

In any of the examples herein, the map elements can be contiguous, and the entire map itself can be contiguous (e.g., each map element touches at least one other map element).

In any of the examples herein, the map elements can represent corresponding components of the software program. If desired, the elements can represent corresponding source code for respective components.

Figure 3A:
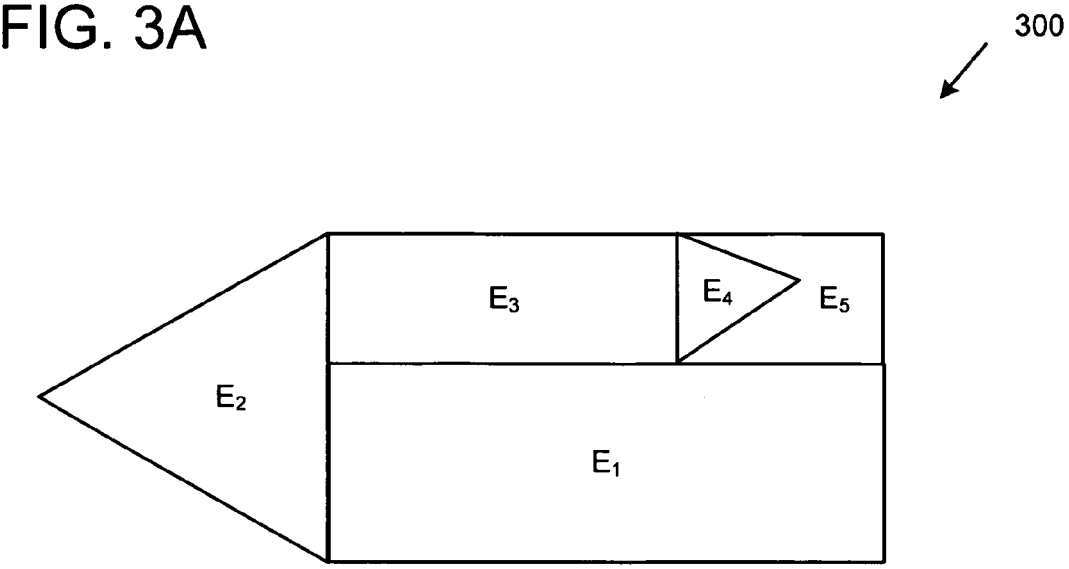
FIGS. 3A and 3B are screenshots of exemplary software maps.

FIG. 3A shows a view (e.g., screenshot) of an exemplary map 300 having five map elements $E_1$-$E_5$. In the example, the elements $E_1$-$E_5$ are visually contiguous (e.g., each element $E_1$-$E_5$ is touching at least one other element in the displayed map).

Although the elements are labeled with text in the example for illustration purposes, in any of the examples herein, such text can be but need not be included on the map.

EXAMPLE 5

Exemplary Map Paradigms

In any of the examples herein, a map element can be depicted as a single contiguous shape. Different elements can have different shapes. The map can be depicted as a geographic map with features mimicking geographic map features (e.g., having differentiable morphology for different elements). The software map can be a cartographic map (e.g., a graphical representation of software components in the style of a cartographic map). A map can also be drawn to resemble a geographic map of terrain, and is sometimes called a "software terrain map."

In any of the examples herein, a grid system can be used for the map so that map elements are constructed of grid elements (e.g., contiguous grid elements). The grid elements can be regularly (e.g., identically) shaped throughout the grid. Such grid elements can be contiguous n-gons (e.g., where n is 3 or greater). The number of grid elements for a map element can be determined based on a metric for the corresponding software component (e.g., the size of the component). For example, in the above example, a hexagonal grid can be used to construct the shapes. If desired, the grid elements (e.g., all grid elements for the map) can be identically shaped. If desired, the entire map (e.g., representing an entire software program) can be placed on a single grid.

In any of the examples herein, a tile approach can be used. In such a case, at least one of the map elements can be constructed as an amalgamation of a plurality of non-overlapping identical tiles (e.g., geometric shapes such as n-gons) depicted as a single, contiguous geometric shape. The number of identical tiles (e.g., the size of the element) can be based on a metric for the corresponding software component (e.g., the size of the component).

Figure 3B:
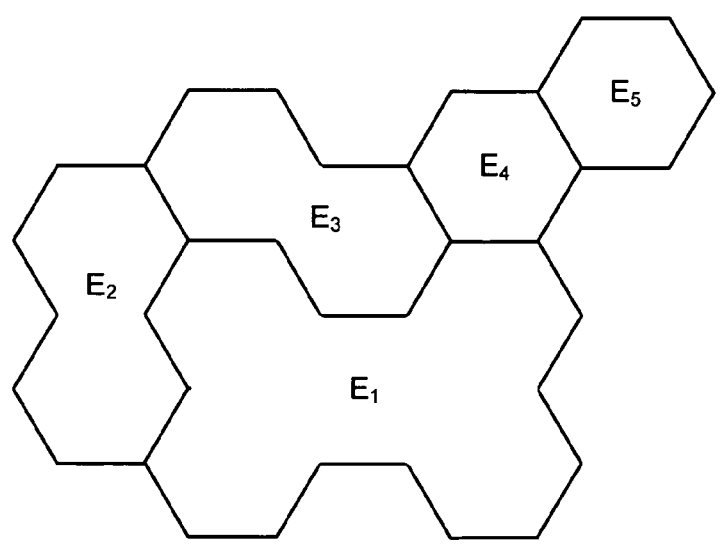

FIG. 3B shows an exemplary software map 350 having five elements $E_1$-$E_5$. In the example, each of the map elements is constructed on a grid system (e.g., a hexagonal grid). The elements can also be described as an amalgamation of hexagons depicted as a single, contiguous geometric shape (e.g., $E_1$ is constructed of 5 hexagons). The entire map 350 is contiguous, and a single grid is used. In the example, the five methods for the software program are represented, and each method is represented by a respective element $E_1$-$E_5$. In practice, a program may have many more methods.

In any of the examples herein, map elements can be depicted as having borders between them (e.g., to assist in differentiating the elements). Alternatively, different colors, patterns, or fills can be used.

In any of the examples herein, a non textline-by-textline (e.g., not a shrunk representation of source code text) representation can be used for constructing a map.

EXAMPLE 6

Exemplary Element Size

In any of the examples herein, the size of a map element can be based on a metric for the respective software component. For example, in the case of source code, a metric of the number of lines in the source code (e.g., the number of lines for the respective method) can be used. Any multiple can be used (e.g., one tile per n lines of source code). In such a case, for example, more lines of source code result in a larger size. In this way, the larger the component appears (e.g., in an editor), the larger the corresponding element will appear. Such an approach can help a viewer associate correspondence between the component and the element. Linear, logarithmic, or other schemes can be used.

Other metrics can be used for size, such as those described herein as metrics for software components.

EXAMPLE 7

Exemplary Relationships

In any of the examples described herein, placement of the map elements can be based on a relationship metric for the respective software components. For example, if an affinity between software components is known, map elements for the respective software components can be placed accordingly (e.g., map elements representing software components having a high affinity can be placed close to one another). Affinity can be measured in a variety of ways, including those described herein.

In place of or in addition to affinity, other relationship metrics can be used. For example, number of times one component invokes another component during execution, number of times components were changed during software development in the same check-in (e.g., by the same person in the same time unit), number of times a developer viewed the components in succession in an editor, similarity between components' names (e.g., number of letters in common), or the like can be used.

EXAMPLE 8

Exemplary Mapping Tool

In any of the examples described herein, a map can be based on the source code of a program. For example, map elements can be created of a size based on the size (e.g., number of lines) of the respective software component (e.g., a method of the program).

Figure 4:
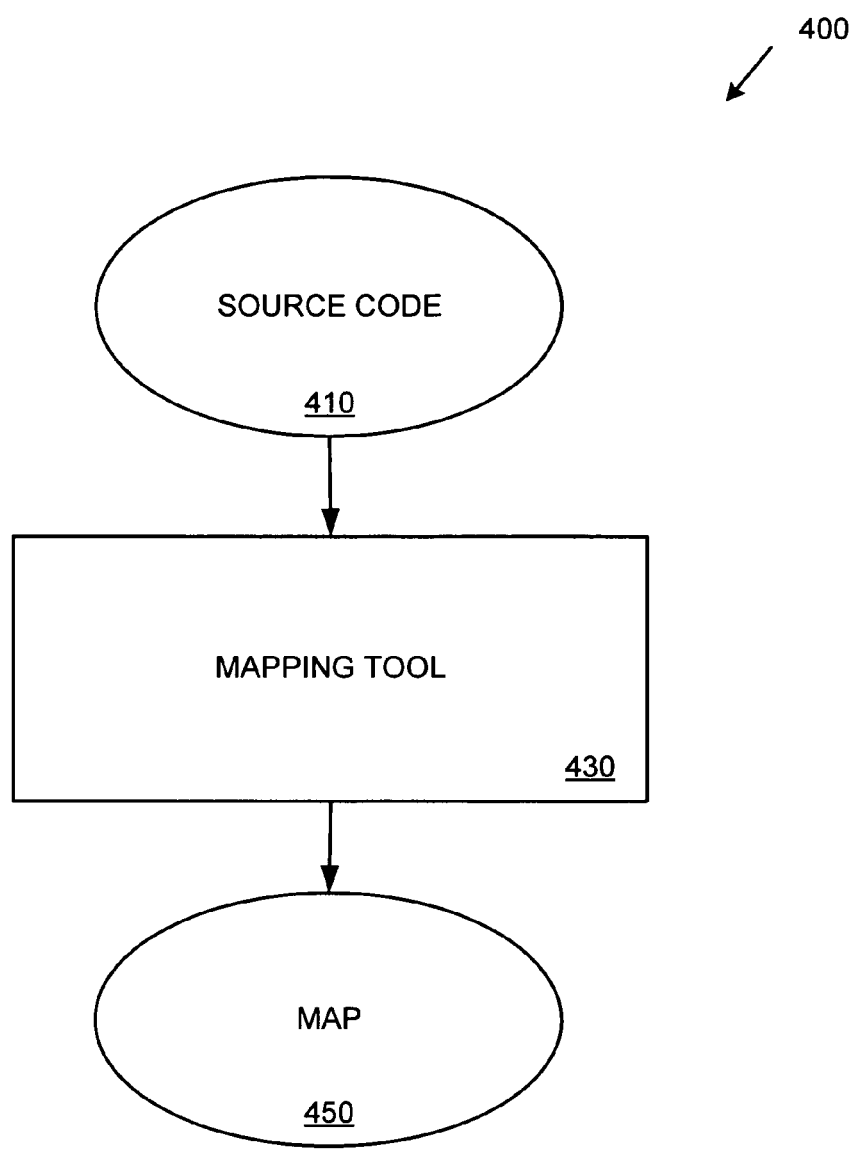
FIG. 4 is a block diagram of a system operable to generate a map from source code.

FIG. 4 is a block diagram of a system 400 operable to generate a map 450 from source code 410. In the example, the mapping tool 430 receives the source code 410. For example, source code can come from a file or set of files (e.g., files stored by a software development environment).

Based on the source code 410, the mapping tool 430 generates a software map 450.

EXAMPLE 9

Exemplary Method for Creating Map

Figure 5:
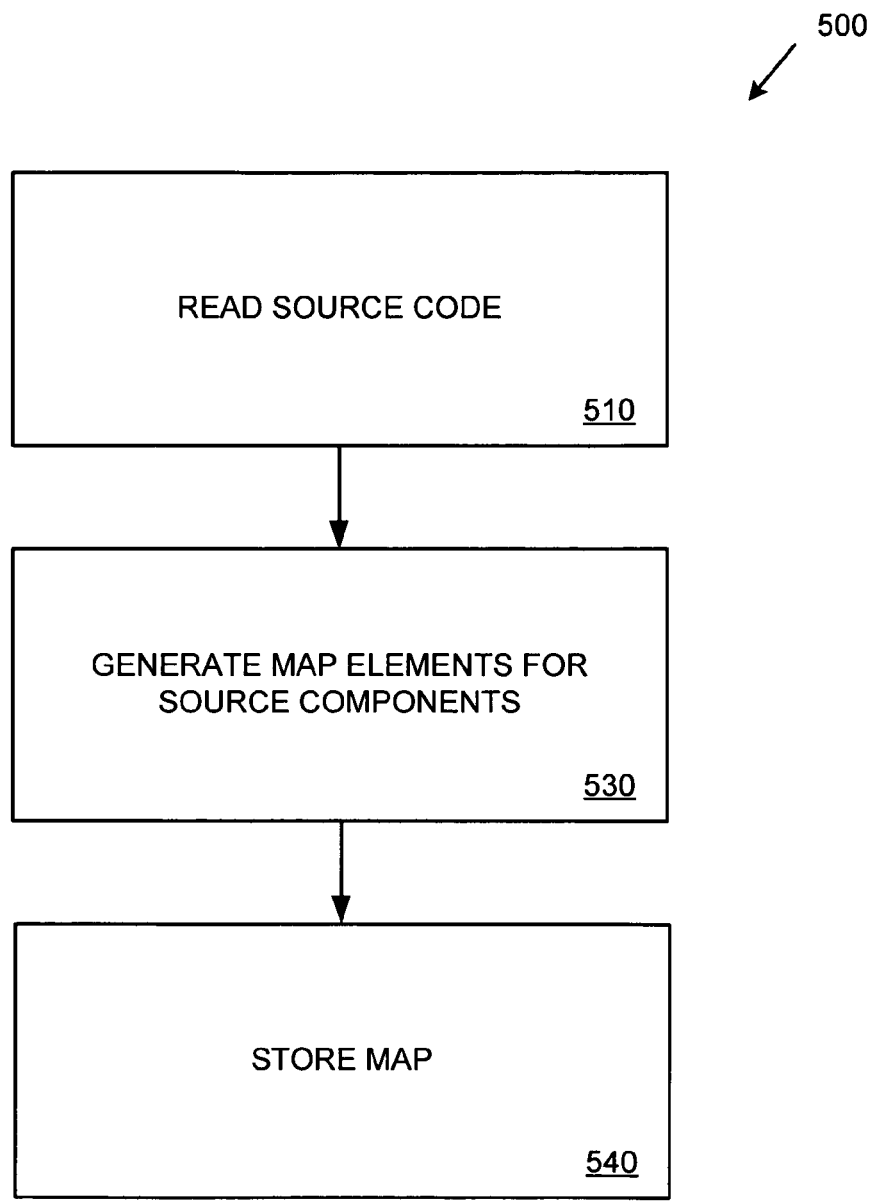
FIG. 5 is a flowchart of an exemplary method of generating a map from source code.

FIG. 5 is a flowchart of an exemplary method 500 of generating a map from source code and can be performed, for example, by the system shown in FIG. 4.

At 510, source code is read (e.g., from a source file or software development project file). At 530, map elements for respective source components within the source code are generated. At 540, the map is stored in one or more computer-readable media (e.g., storage media).

In practice, the map can then be displayed, printed, or both.

EXAMPLE 10

Exemplary Software Map Based on Source Code

FIGS. 6A and 6B show an exemplary map 600 based on source code 630. The source code excerpt 630 shows four methods (method1, method2, method3, and method4). A corresponding map 650 is shown in FIG. 6B.

For example, the sizes of the elements $E_1$ -$E_4$ can be based on a metric for the respective methods.

EXAMPLE 11

Exemplary Advantages

Various advantages can result from using the techniques described herein. For example, when a new developer is coming on to a software project, it is often difficult for the developer to understand the totality of the source code. Accordingly, when debugging source code, the new developer may have difficulty identifying where within the project execution has progressed. Or, when browsing source code to determine how the source fits together, the developer may become lost. In fact, the developer may find that inquisitive navigation throughout the code results in navigating back to the starting point without even realizing that a circular path has taken place.

By displaying the software as a map, software components (e.g., methods) can be depicted as geometrically differentiable features. After some experience with the map, the software developer can begin to recognize the various features due to their size, shape, and location within the map. So, for example, if a map shows where within a developer is navigating, when the developer navigates in a circle, the developer will recognize having returned to the map element, which represents a respective software component.

EXAMPLE 12

Exemplary System for Indicating Current Location on Map

In any of the examples herein, a current location within source code can be indicated on a map. For example, when navigation by a developer or software development tool navigates to a current location, such a current location can be indicated by visually emphasizing the map element.

Figure 7:
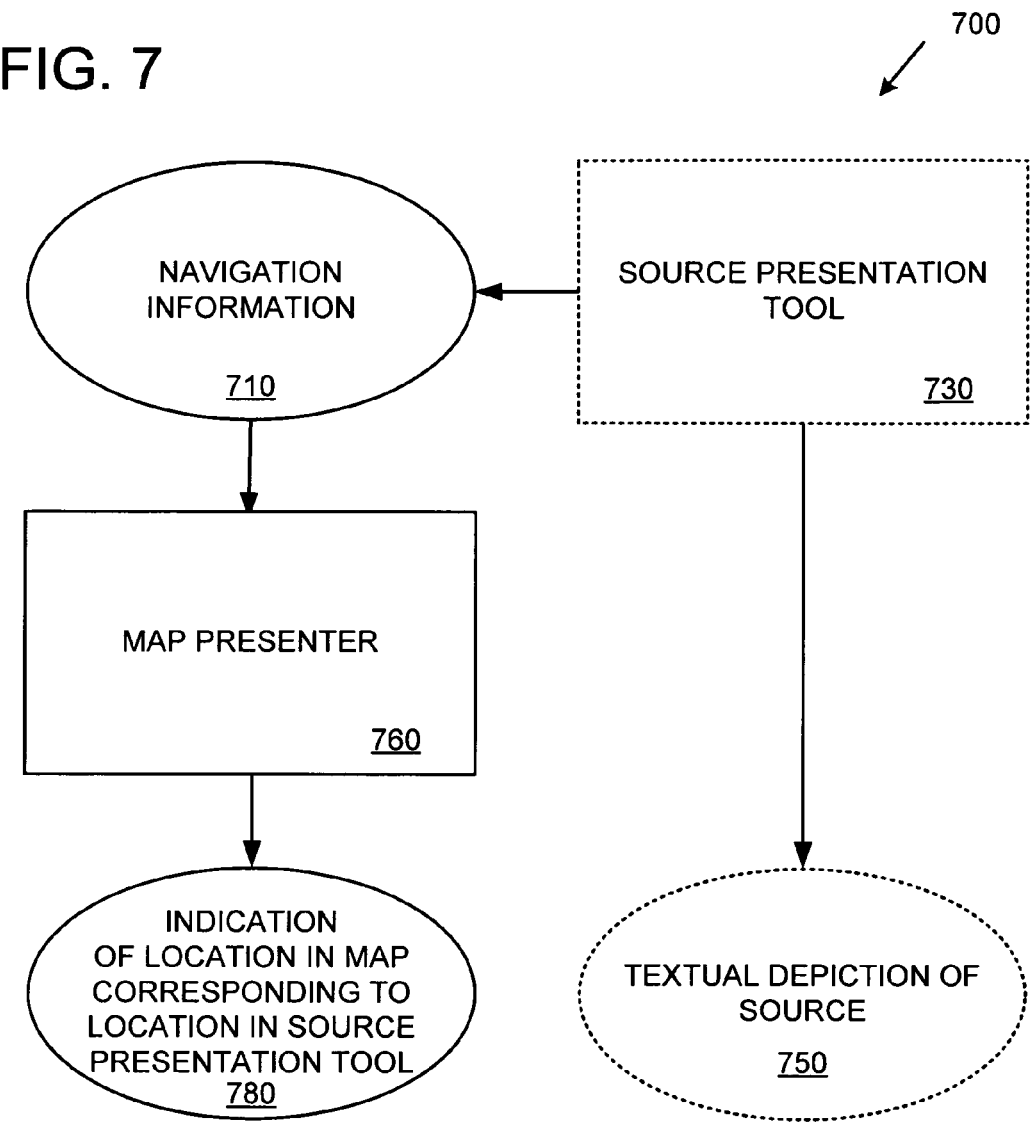
FIG. 7 is a block diagram showing an exemplary system operable to indicate on a map a location corresponding to a current location in a source presentation tool.

FIG. 7 is a block diagram showing an exemplary system 700 operable to indicate on a map a location corresponding to a current location in a source presentation tool 730. In the example, a source presentation tool 730 can present a textual depiction of the source code 750. In any of the examples herein, a source presentation tool 730 can include an editor or debugger. For example, a source code editor can display a window showing the source, or a debugger can show the source code (e.g., after reaching a breakpoint).

The source presentation tool 730 can send navigation information 710 to the map presenter 760. For example, a current line, current method, or other reference indicating to where within the source code the navigation has progressed can be sent. The map presenter 760 can then generate an indication 780 of the location in the map corresponding to the location in the source being presented by the source presentation tool 730.

Such an indication can include applying an icon, pushpin, graphic, flag, highlighting, blinking, sparkling, coloring, animating, or the like to the map (e.g., for, at, or within the corresponding map element) or otherwise visually emphasizing the location.

EXAMPLE 13

Exemplary Method for Indicating Current Location on Map

Figure 8:
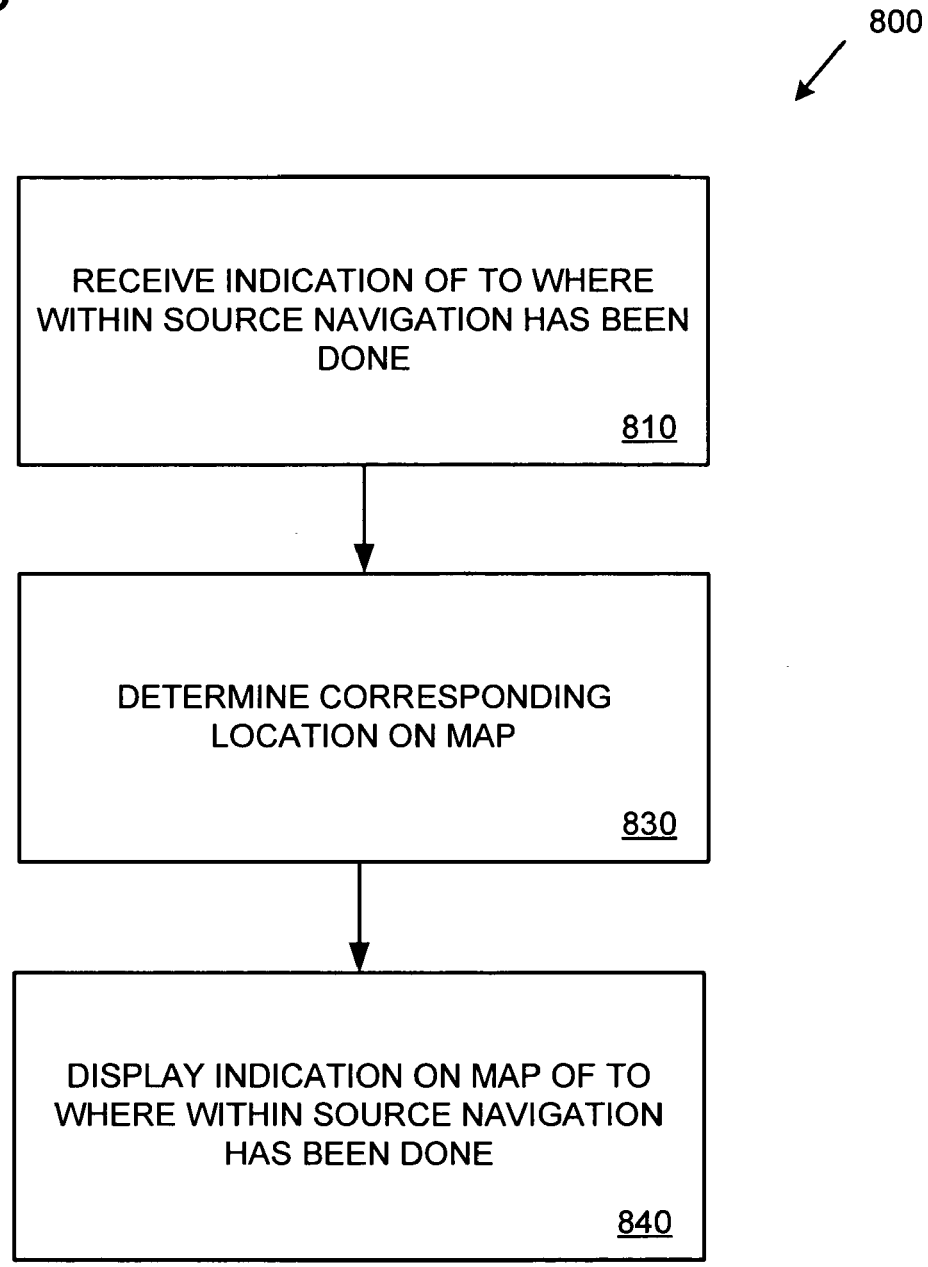
FIG. 8 is a flowchart of an exemplary method of indicating on a map a location corresponding to a current location.

FIG. 8 shows an exemplary method 800 of indicating on a map a location corresponding to a current location (e.g., in a source presentation tool). At 810, an indication of a location within the source code to where navigation has progressed is received. Such a location is sometimes called the "current location." At 830 a location within the map corresponding to the current location is determined. For example, a software component for the current location (e.g., the method in which the current line of source appears) and a corresponding map element can be determined (e.g., by a mapping function).

Then, at 840, an indication on the map of where within source navigation has progressed can be displayed. For example, the location can be visually emphasized as described herein.

EXAMPLE 14

Exemplary Map Indicating Current Location

Figures 9A, 9B:
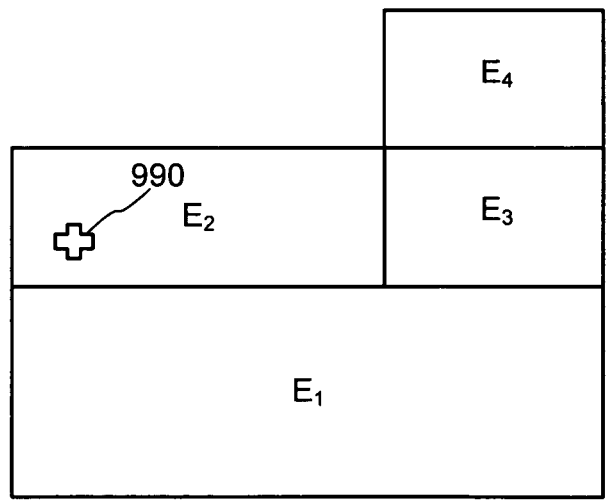
FIG. 9A is an exemplary presentation of a current location within source.
FIG. 9B is an exemplary map representing the program and an indication of a location within the map corresponding to the current location.

FIGS. 9A and 9B show an exemplary software map 950 indicating a current location being browsed in source code presentation tool 900.

In the example, a source code presentation tool 900 is presenting a window 930 showing an excerpt of source code. A current position can be determined, for example, by where the cursor or other indicator appears in the window 930. The user (e.g., a developer) is currently viewing method2.

FIG. 9B shows a software map 950 with an indication 990 visually emphasizing the element $E_2$ corresponding to method2. Thus, the user can understand that navigation has proceeded to the depicted method within the map.

In any of the examples herein, rather than or in addition to showing a current location, some other location can be shown, such as a location identified as a location of interest or likely problem. For example, if a software development team is in the process of testing software, the region(s) being tested can be indicated (e.g., displayed or printed out for consideration by the team). In practice, many more map elements can be shown to represent many more software components.

EXAMPLE 15

Exemplary System Indicating Path on a Map

Figure 10:
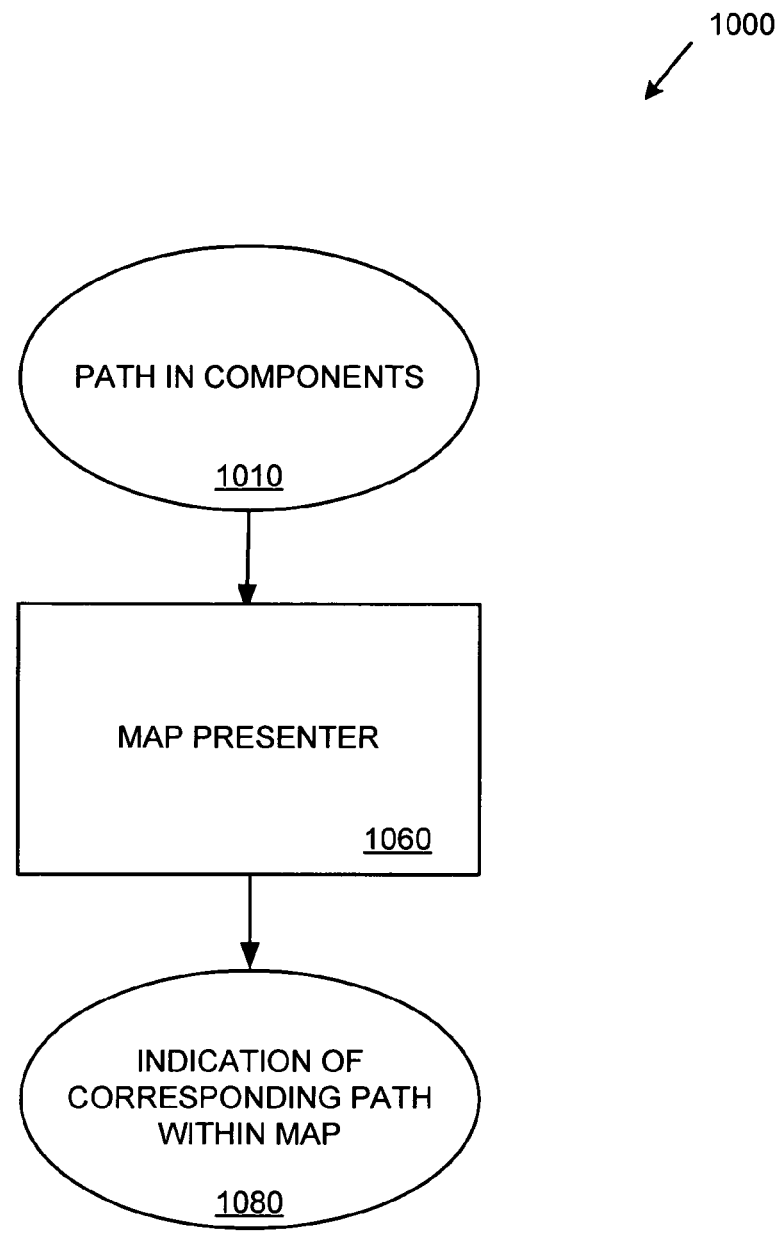
FIG. 10 is a block diagram of an exemplary system operable to indicate a path within a map.

In any of the examples described herein, a path can be indicated on a map. FIG. 10 shows an exemplary system 1000 operable to indicate a path within a map.

In the example, a map presenter 1060 receives an indication 1010 of a path in components of the program (e.g., a path between, within, or among components). For example, a path between components appearing in source code can be received. Such a path can indicate an execution path or a path navigated by a user during browsing.

The map presenter 1060 generates an indication 1080 of a corresponding path within a software map (e.g., a path between, within, or among respective map elements). The indication can take many forms, such as lines (e.g., with arrowheads) indicating beginning and ending points for the path or segments of the path.

EXAMPLE 16

Exemplary Method of Indicating Path on a Map

FIG. 11 shows a flowchart of an exemplary method 1100 of indicating a path within a map. At 1110, an indication of a path for program components is received. For example, a list of software components or a next software component can be received. At 1130 locations for a corresponding path on the map are determined. For example, locations of the respective map elements are determined. At 1140, the software map is displayed with the corresponding path indicated thereon.

EXAMPLE 17

Exemplary Method of Indicating Path on a Map

Figure 12A:
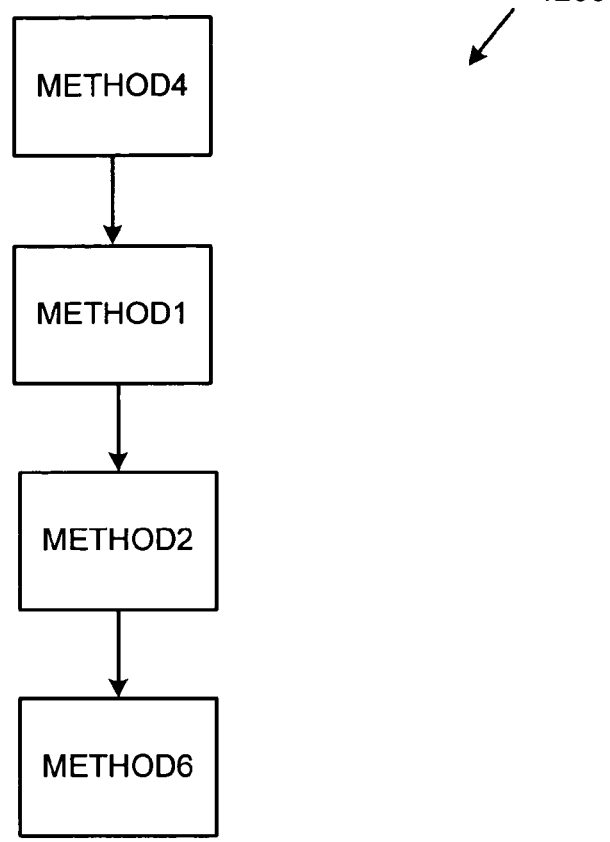
FIG. 12A is an exemplary path for software components.
Figure 12B:
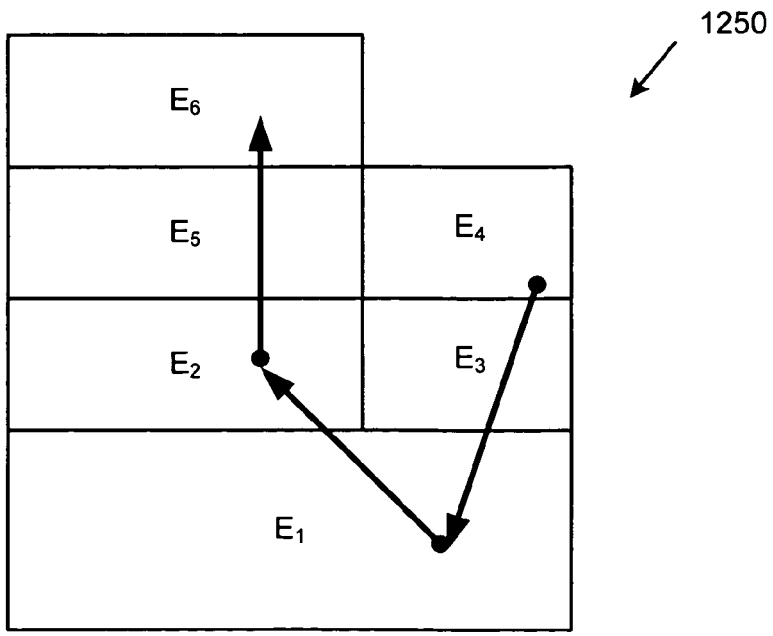
FIG. 12B is an exemplary map representing the program and an indication of the path within the map.

FIGS. 12A and 12B show a map 1250 indicating a path for a corresponding path 1200 for software components.

In the example, a path 1200 from method4 to method1 to method2 to method6 is shown. For example, an execution path between two breakpoints may have taken the indicated path.

FIG. 12B visually depicts the path on a software map 1250. The path is shown by using arrows pointing from $E_4$ to $E_1$ to $E_2$ to $E_6$ (e.g., the map elements corresponding to the software components in the path). In practice, many more map elements can be shown to represent many more software components.

EXAMPLE 18

Exemplary Advantages of Depicting Paths

Various advantages can result from using the techniques described herein. For example, when visually depicting paths, paths can be more easily dealt with by a developer. For example, similarities and differences between paths can be more readily identified. Also, path patterns can be more easily detected.

For example, consider a scenario in which the path is shown on the software map after arriving at a breakpoint. Each time the developer resumes execution, execution stops after proceeding along a path of methods. Instead of depicting the methods as a text list, a visual depiction of the path can be shown.

If it turns out that successive arrivals at the breakpoint are cycling between three different paths, a developer can immediately see the cycle based on the pattern of successive paths shown on the map. Detecting such a path via the text list can be difficult or impossible.

EXAMPLE 19

Exemplary System Indicating Subset Membership

Figure 13:
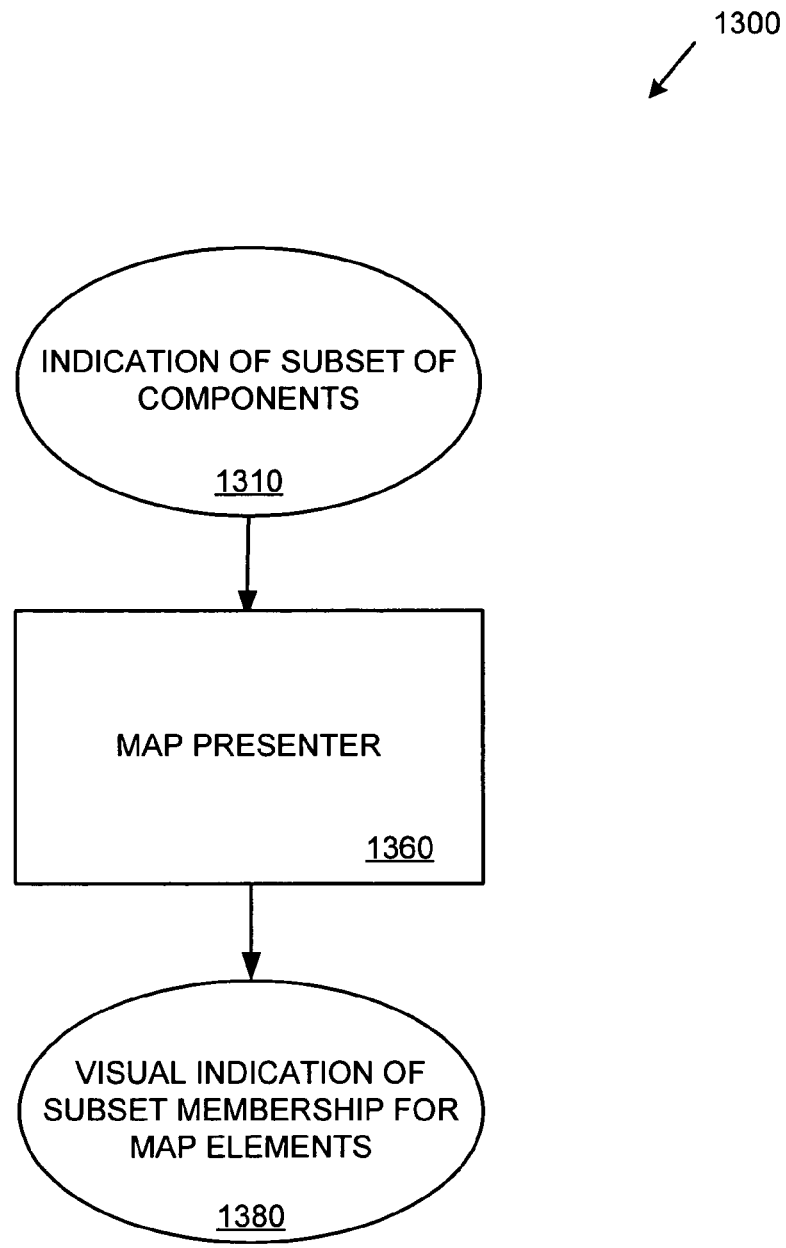
FIG. 13 is a block diagram of an exemplary system operable to indicate subset membership within a map.

FIG. 13 is a block diagram of an exemplary system 1300 operable to indicate subset membership within a map. In the example, a map presenter 1360 receives an indication 1310 of a subset of software components. For example, any subset of software components can be indications. A subset may indicate an answer to a query for those software components that satisfy any one or more arbitrary criteria. For example, criteria can include which components were worked on by a particular developer, which components are currently being worked on by a particular developer, which components have been edited in the last d days, which components access a particular data structure or variable, which components call a particular method, which components access a particular locking mechanism, which components have experienced the most crashes (e.g., during customer use), which components have passed the most unit tests, which components have failed the most unit tests, which components use certain programming features (e.g., loops, switches, and the like), and the like.

Based on the indication 1310 of the subset, the map presenter 1360 generates a visual indication 1380 of subset membership for map elements corresponding to the software components. For example, such an indication can include applying an icon, pushpin, graphic, flag, highlighting, blinking, sparkling, coloring, animating, or the like to the map element (e.g., for, at, or within the corresponding map element) or otherwise visually emphasizing the element.

EXAMPLE 20

Exemplary Method of Indicating Subset Membership

Figure 14:
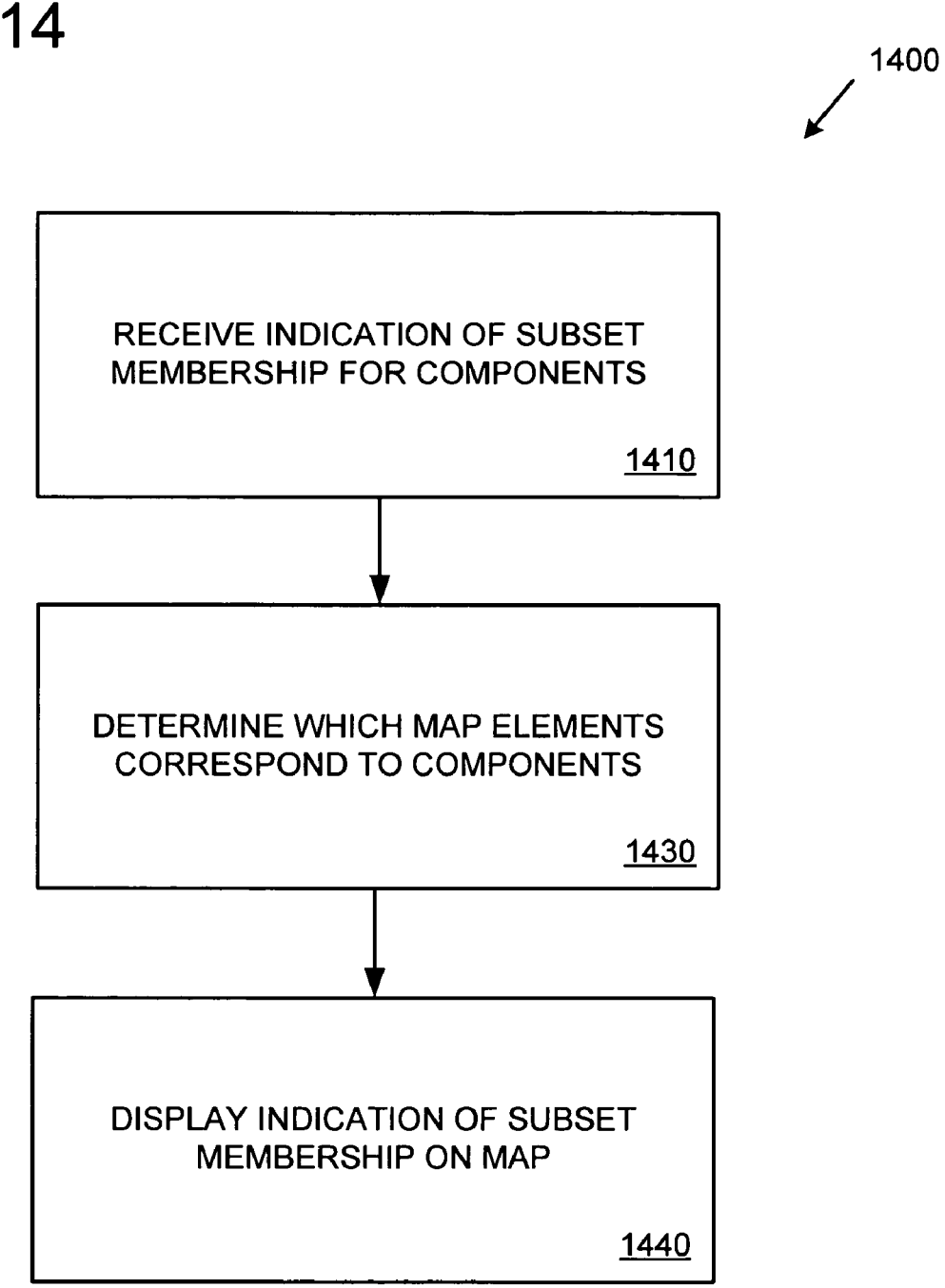
FIG. 14 is a flowchart showing an exemplary method of indicating subset membership within a map.

FIG. 14 is a flowchart showing an exemplary method 1400 of indicating subset membership within a map. At 1410, an indication of subset membership is received for software components. For example, one or more criteria can be used as described herein.

At 1430, it is determined which map elements correspond to the components. For example, a lookup or other function can be used. At 1440, a visual indication of subset membership is displayed on the map for the map elements.

Membership in one or more sets can be shown. For example, a different indication can be used for each set so that a viewer can quickly identify which elements are members of which sets, which are members of none of the sets, and how membership in the sets overlaps.

EXAMPLE 21

Exemplary Map Indicating Subset Membership

Figures 15A, 15B:
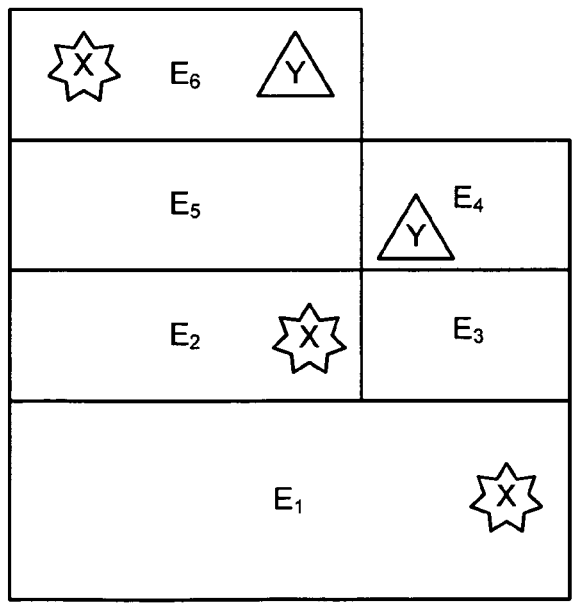
FIG. 15A is an exemplary indication of subset membership for software components.
FIG. 15B is an exemplary map representing the software and an indication of the subset membership for the components within corresponding map elements.

FIGS. 15A and 15B show an exemplary map 1550 representing software components and an indication of the subset membership for the components. In the example, an indication 1500 of the subset membership is shown in which there are two sets, X and Y. Method1, Method2, and Method6 are members of set X. Method4 and Method6 are members of set Y.

FIG. 15B shows an exemplary corresponding map 1550 showing subset membership. In the example, a star icon is used to indicate membership in set X, and a triangle icon is used to indicate membership in set Y.

EXAMPLE 22

Exemplary Advantages of Indicating Subset Membership

Various advantages can result from using the techniques described herein. For example, when depicting set membership, a viewer can more easily determine whether any software components are members of particular sets, whether a component is a member of no sets, whether a component is a member of more than one set, or some combination thereof. For example, as shown in the map 1550, it can instantly be recognized that Method6 (corresponding to element $E_6$) is the only method that is a member of both sets.

Such a technique might be helpful, for example, when determining whether there are any components that touch a particular data structure that is intended to be protected by a lock. If a first set indicates those methods that touch the data structure, and the second set indicates those methods that access a lock mechanism, any methods shown in the map that are not a member of both sets may be suspect and warrant further investigation for possible programming errors (e.g., race conditions).

As described herein, the maps can be printed if desired. For example, a developer may wish to keep a printed copy indicating which methods are being supervised or under test.

EXAMPLE 23

Exemplary Indication of Metric Level

In any of the examples described herein, instead of or in addition to indicating set membership, a map can indicate a level of a metric. For example, for any arbitrary metric described herein (e.g., how many seconds a component is executed, how many times the component has been edited), a component can be depicted (e.g., highlighted) in the map to indicate the level of the metric. For example, if color is used for highlighting execution time, then those components having higher execution time can be depicted in a darker color (e.g., darker red) compared to those components having lower execution time. Such a metric can be continuous and can be depicted continuously. Or, a step function can be used (e.g., using different shades for different ranges of the metric).

EXAMPLE 24

Exemplary Use of Affinity for Placement

In any of the examples described herein, when placing map elements, affinity between the corresponding software components can be taken into account. For example, an affinity for the software components can be received, and placement of corresponding map elements can be based on affinity. So, for example, map elements representing components having a high affinity can be placed more closely together than elements representing components having a lower affinity. Elements can be located near each other in proportion to the corresponding components' affinity.

Such affinity can be measured in a variety of ways. For example, a static approach in which the number of times a call to another method appears in the source code of another method can be used. A dynamic approach can monitor execution of a program to determine the number of calls during execution between methods and assign a weighted affinity accordingly. Affinity can thus be a scalar or some other value that can be compared for the methods. When constructing the map, corresponding elements can be placed so that the represented components having a higher affinity are closer together. Components having lower affinity need not be placed further apart, but can be.

Any of a variety of other affinity measurements can be formulated related to indicate flow control, data flow, or some combination thereof. For example, if the same field is written by two components, additional affinity can be awarded between the components.

In one example, to compute affinity between $c_1$ and $c_2$, a certain number of points (e.g., 20) is assigned if $c_1$ calls $c_2$, 20 additional points if $c_2$ calls $c_1$, and additional points (e.g., 1) are added for each field read or written in both $c_1$ and $c_2$.

Affinity can be tailored or adapted depending on how often the developer navigates between two methods (e.g., so that they appear closer in the map). Also, affinity can be tailored or adapted so that paths overlaid on the map (e.g., execution paths) are drawn as snakes (e.g., non crisscrossing) rather than scribbles (e.g., crisscrossing).

Affinity can involve solely information about the static structure (e.g., of source code), but other measures from the source history, traces, or information from a bug database or communications (e.g., emails or instant messages) can be included.

EXAMPLE 25

Exemplary System Operable to Construct Map Based on Affinity

Figure 16:
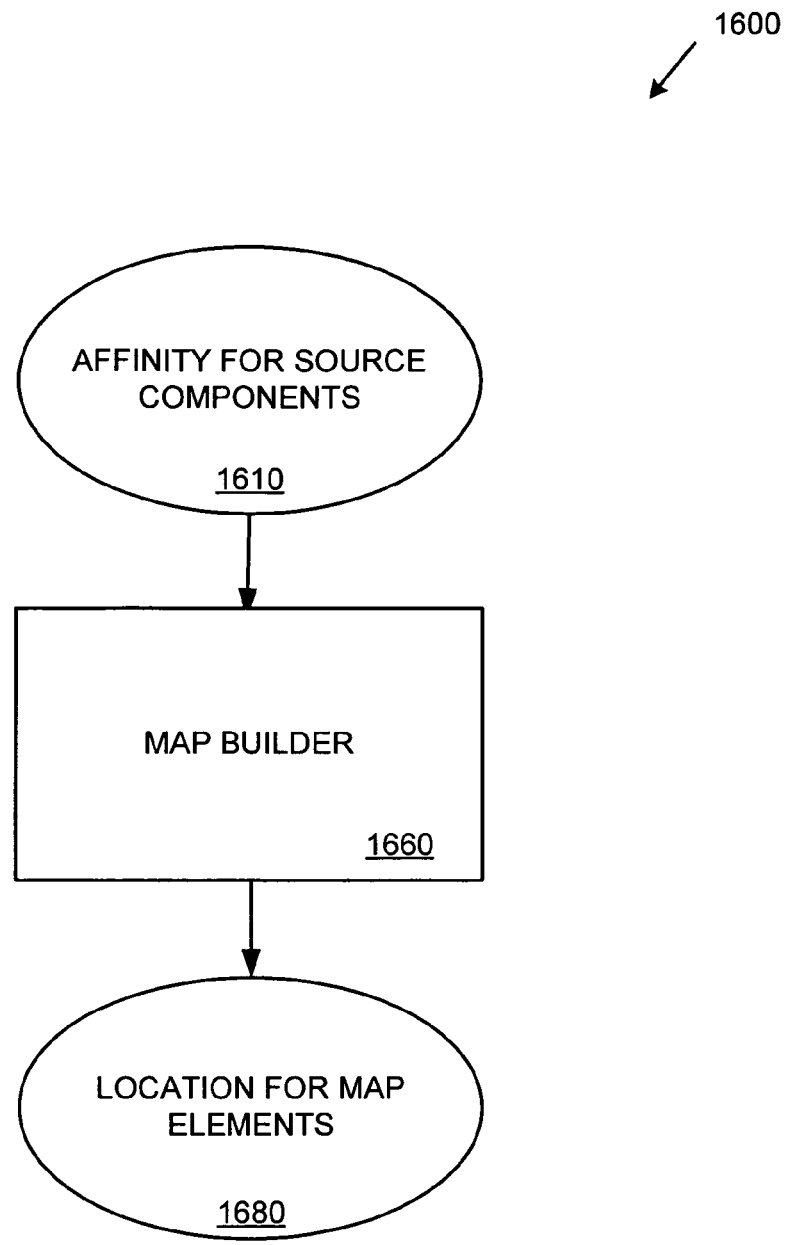
FIG. 16 is a block diagram of an exemplary system for building a map based on affinity.

FIG. 16 is a block diagram of an exemplary system 1600 for building a map based on affinity. In the example, a map builder 1660 receives an indication 1610 of affinity for source components to be drawn in the map. The affinity can be any measures of affinity described herein (e.g., affinity between methods). In addition, magnitude for source components can be received. For example, the magnitude can be any of the metrics for a software component described herein, such as number lines of source code for a method.

Based on the affinity 1610 for the source components, the map builder 1660 generates a location 1680 for the map elements according to the affinity as described herein. If magnitude is included, the map builder 1660 can use it to determine the size of respective map elements. In practice, the map is then stored, displayed, printed, or some combination thereof.

EXAMPLE 26

Exemplary System Operable to Construct Map Based on Affinity

Figure 17:
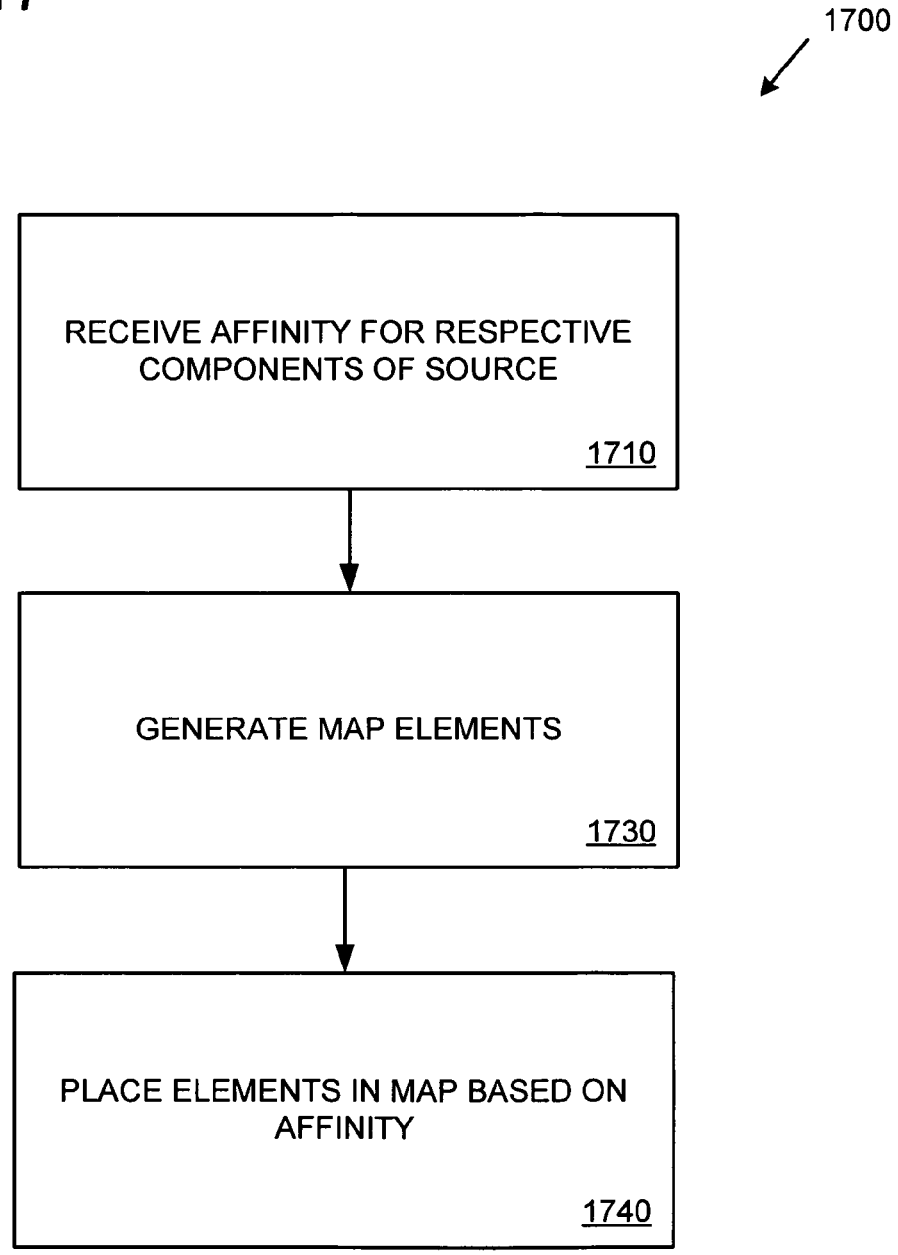
FIG. 17 is a flowchart showing an exemplary method of building a map based on affinity.

FIG. 17 is a flowchart of an exemplary method 1700 of building a map based on affinity. The affinity can be any measures of affinity described herein (e.g., affinity between methods). Magnitude can also be used. For example, the magnitude can be any metric for the software component, such as number lines of source code for a method.

At 1710, affinity for components of the software are received. If magnitude is included, it can also be received. At 1730, map elements are generated for respective components. For example, elements associated with components having a large magnitude can have a large size (e.g., a greater number of tiles can be used).

At 1740, the map elements are placed in the map based on affinity. For example, elements associated with components having greater affinity can be placed more closely together. In practice, the elements can be placed and generated in a combined action.

In practice, the map is then stored, displayed, printed, or some combination thereof.

EXAMPLE 27

Exemplary Map Indicating Magnitude and Affinity

Figures 18A, 18B:
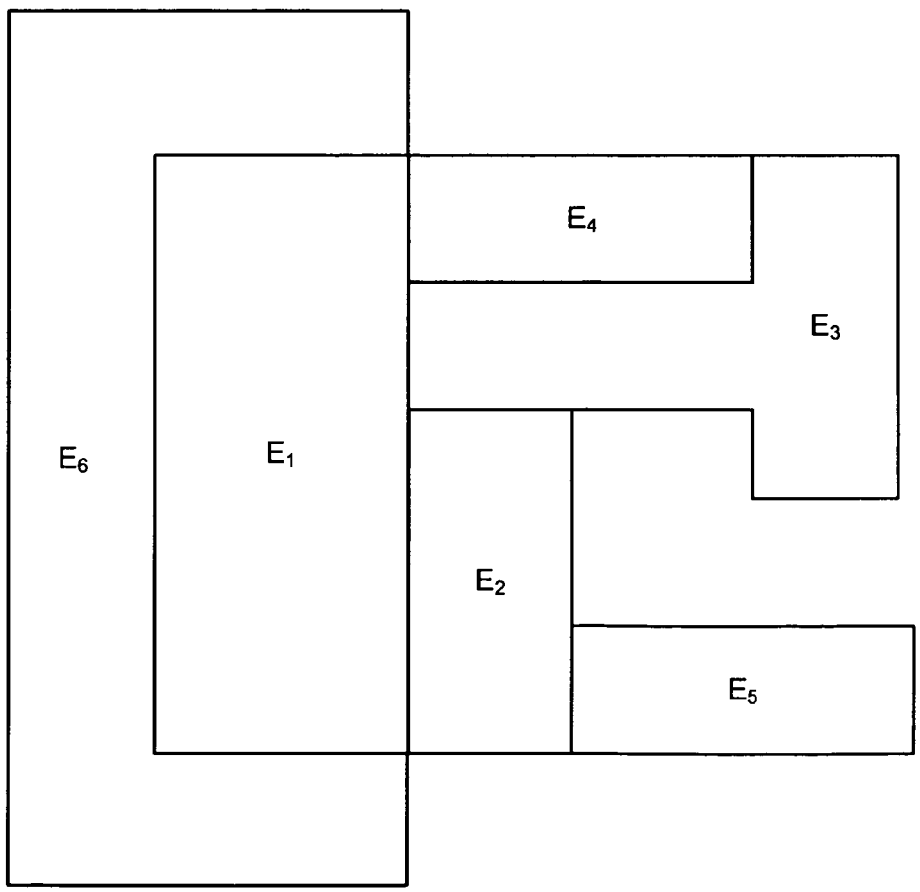
FIG. 18A is an exemplary indication of magnitude and affinity for software components.
FIG. 18B is an exemplary map representing the software with the map elements constructed and arranged based on the magnitude and affinity.

FIGS. 18A and 18B show an exemplary map 1850 indicating magnitude and affinity. In the example, information 1800 indicating magnitude and affinity for a set of software components (e.g., methods) indicates that Method6 is the greatest method (e.g., has the most number of lines), and that Method2 and Method3 have great affinity for Method1, while Method4 does not have great affinity for Method5.

Accordingly, the map 1850 shows E6 as the largest method, and Method2 and Method3 are placed to touch Method1. Method4 does not touch Method5.

EXAMPLE 28

Techniques for Satisfying Affinity Placement

In practice, attempting to construct a map so that those element representing components having greater affinity are placed closer to one another turns out to be a difficult computing problem. Minimizing the following can achieve the goal, but it is an NP-complete problem:

$$\sum_{(c_1,c_2)\in C} \text{Affinity}(c_1, c_2) \times \text{Distance}(c_1, c_2) \qquad (1)$$

where Affinity($c_1$,$c_2$) comprises an affinity between two components $c_1$ and $c_2$ out of the components C, and Distance($c_1$, $c_2$) comprises a distance between map elements representing the two components $c_1$ and $c_2$.

However, there are certain heuristics that can be applied to provide a useful solution, even if the solution may not be the optimal one. For example, in any of the examples herein, after placing an element in the map, the element can be morphed after placement to accommodate placement of another element in the map.

EXAMPLE 29

Exemplary System Operable to Place Elements in a Map

Figure 19:
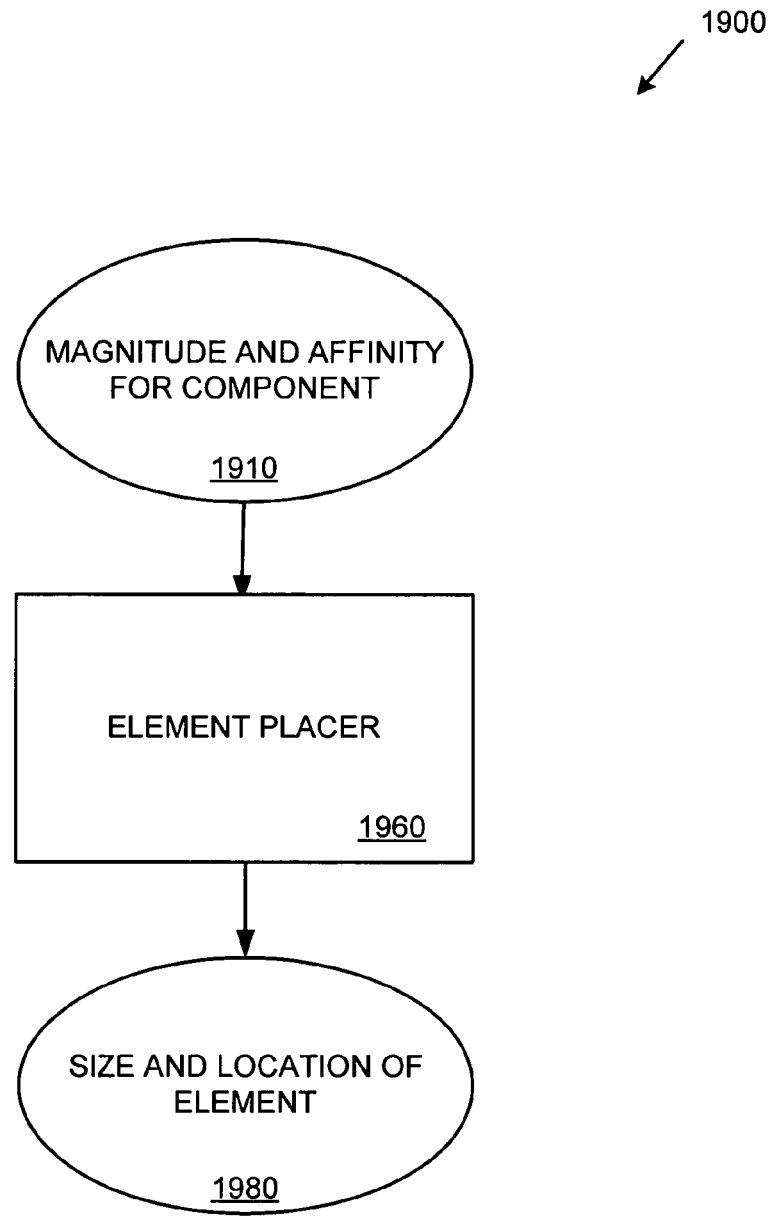
FIG. 19 is a block diagram of an exemplary system operable to place elements based on magnitude and affinity.

FIG. 19 is a block diagram of an exemplary system 1900 operable to place elements in a map based on magnitude and affinity. In the example, an element placer 1960 receives magnitude and affinity information 1910 for a component. The element placer 1960 then indicates a size and location of the element 1980 for placement in the map. As described herein, map elements already placed can be morphed to accommodate placement of one or more additional elements in the map (e.g., to satisfy an affinity placement goal). For example, an element can be shifted or moved as indicated by the element placer 1960.

EXAMPLE 30

Exemplary Method of Placing Elements in a Map

Figure 20:
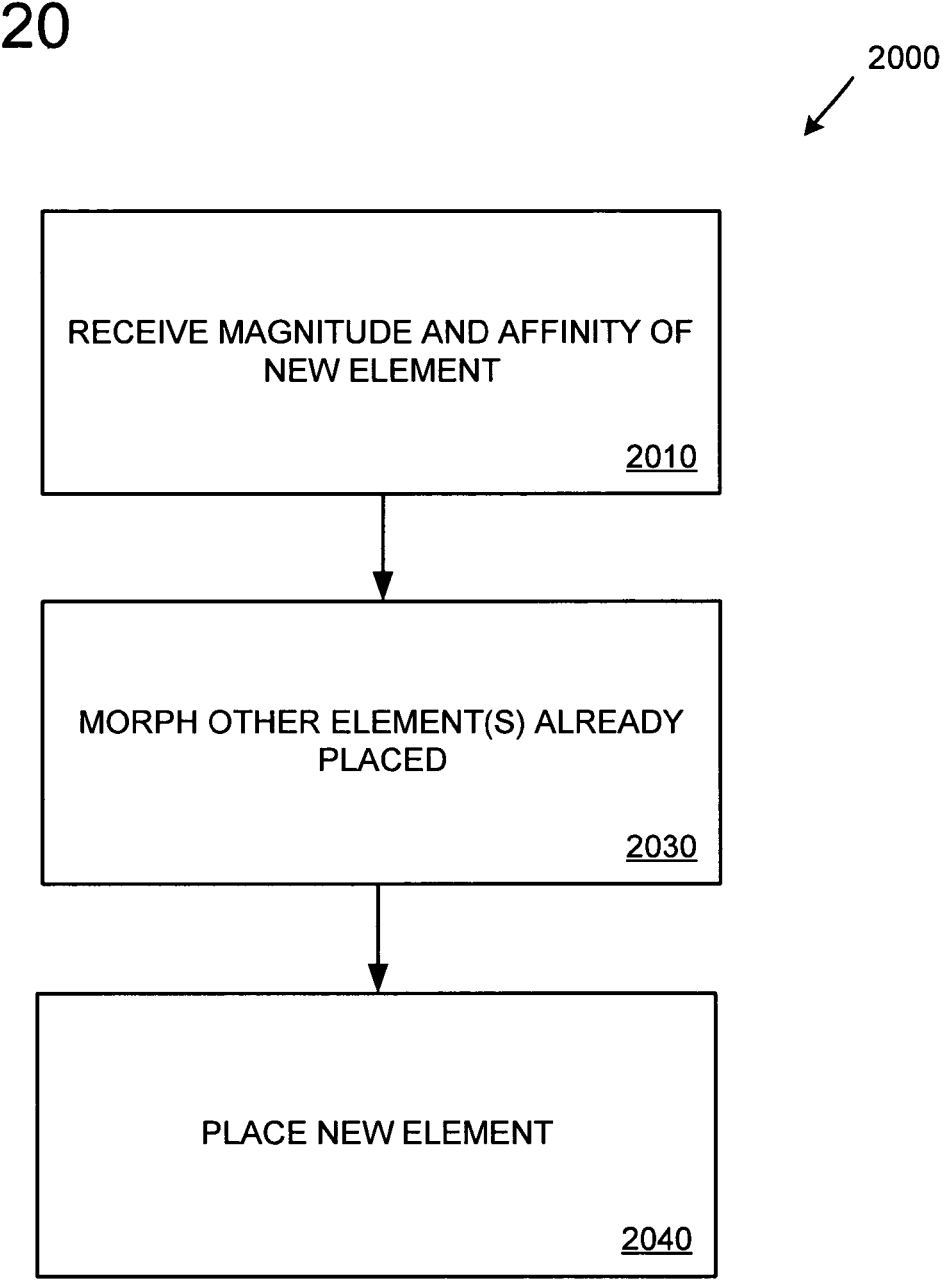
FIG. 20 is a flowchart showing an exemplary method of placing new elements, including morphing one or more other elements already placed.

FIG. 20 is a flowchart showing an exemplary method 2000 of placing new elements into a map. At 2010, magnitude and affinity of a new element to be placed in the map is received. At 2040, the element is placed in the map. If necessary (e.g., as indicated by the magnitude and affinity), one or more other elements already placed in the map can be morphed at 2030.

EXAMPLE 31

Exemplary Morphing

In any of the examples described herein, morphing of an element already placed in the map can be achieved in a variety of ways. For example, an element can be shifted to free up space next to another element to make room for an element having high affinity to the other element.

In an implementation involving tiles, an already-placed portion of the element corresponding to a tile can be moved to another location in the map. Movement can preserve contiguousness of the element.

For example, a scheme tracking claimed and taken tile-sized portions (e.g., in a grid) for elements can be used. Both claimed and taken tile-sized portions are occupied, but taken portions cannot be moved after labeled as taken. Claimed portions can be moved, as long as contiguousness is preserved. To ensure that contiguousness is preserved, an invariant can be enforced so that every portion in the element is adjacent to at least one taken portion (e.g., by increasing the number of taken portions if necessary).

Also, when morphing one element, it may become desirable to morph another element to accommodate the morphing, setting up a cascading effect among the elements. However, a certain limit (e.g., number of cascading morphs) can be set to avoid performance degradation.

Because morphing can involve surrendering area (e.g., one or more grid elements), it is sometimes call "renouncement."

EXAMPLE 32

Exemplary Map Showing Morphed Element

Figure 21A:
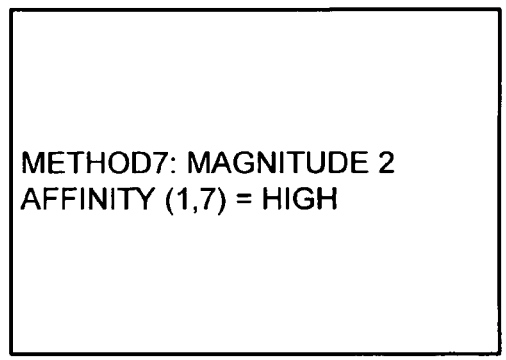
FIG. 21A is an exemplary indication of magnitude and affinity for a new software component to be added to a map.
Figure 21B:
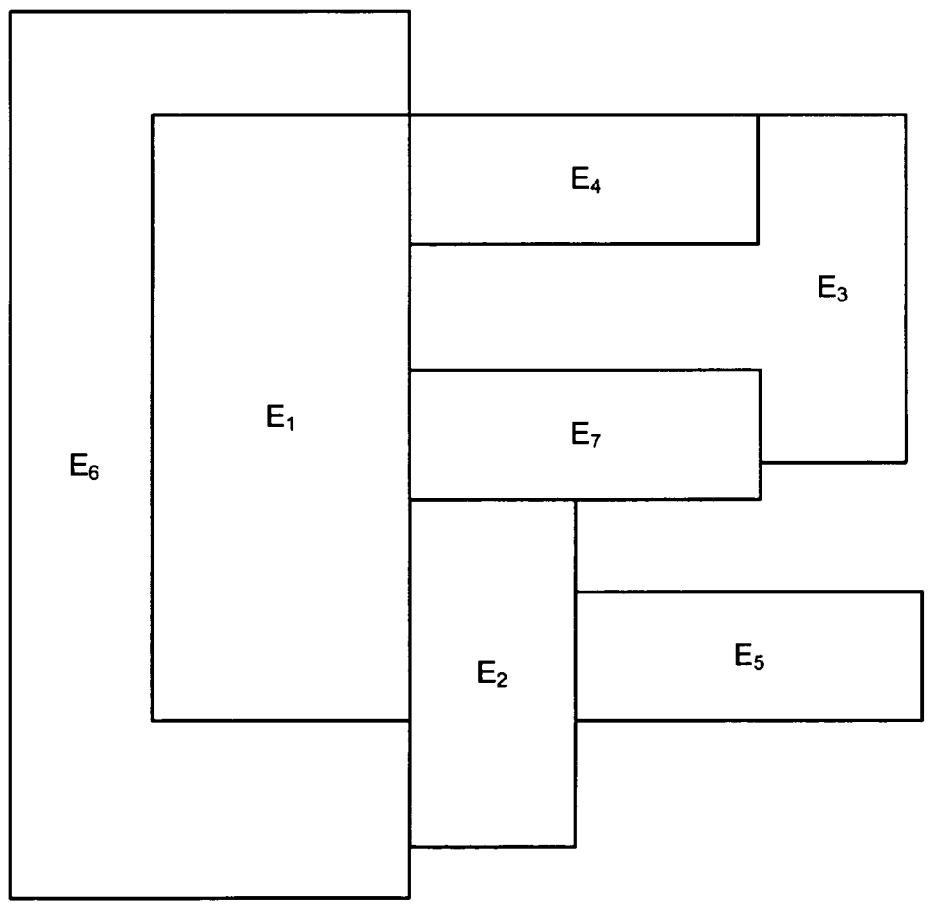
FIG. 21B is an exemplary map into which an element corresponding to the software component based on the magnitude and affinity has been added after having morphed an element already placed in the map.

FIGS. 21A and 21B show an exemplary map 2150 having a morphed element $E_2$. In the example, a new element for Method7 is being added to the map 1850 of FIG. 18B. The information 2100 for Method7 indicates that it has a magnitude of 2 and a high affinity for Method1. However, examination of the map 1850 of FIG. 18B indicates that there is a shortage of space next to $E_1$, which represents Method1. Accordingly, $E_2$ is morphed by moving a portion of it below its original location (e.g., it is shifted downward). The morphing opens up a spot into which the element $E_7$ can be placed to represent the high affinity between Method1 and Method7.

In practice, a large number of elements can be morphed as a large map of many more elements is constructed.

EXAMPLE 33

Exemplary Software Terrain Map

Figure 22:
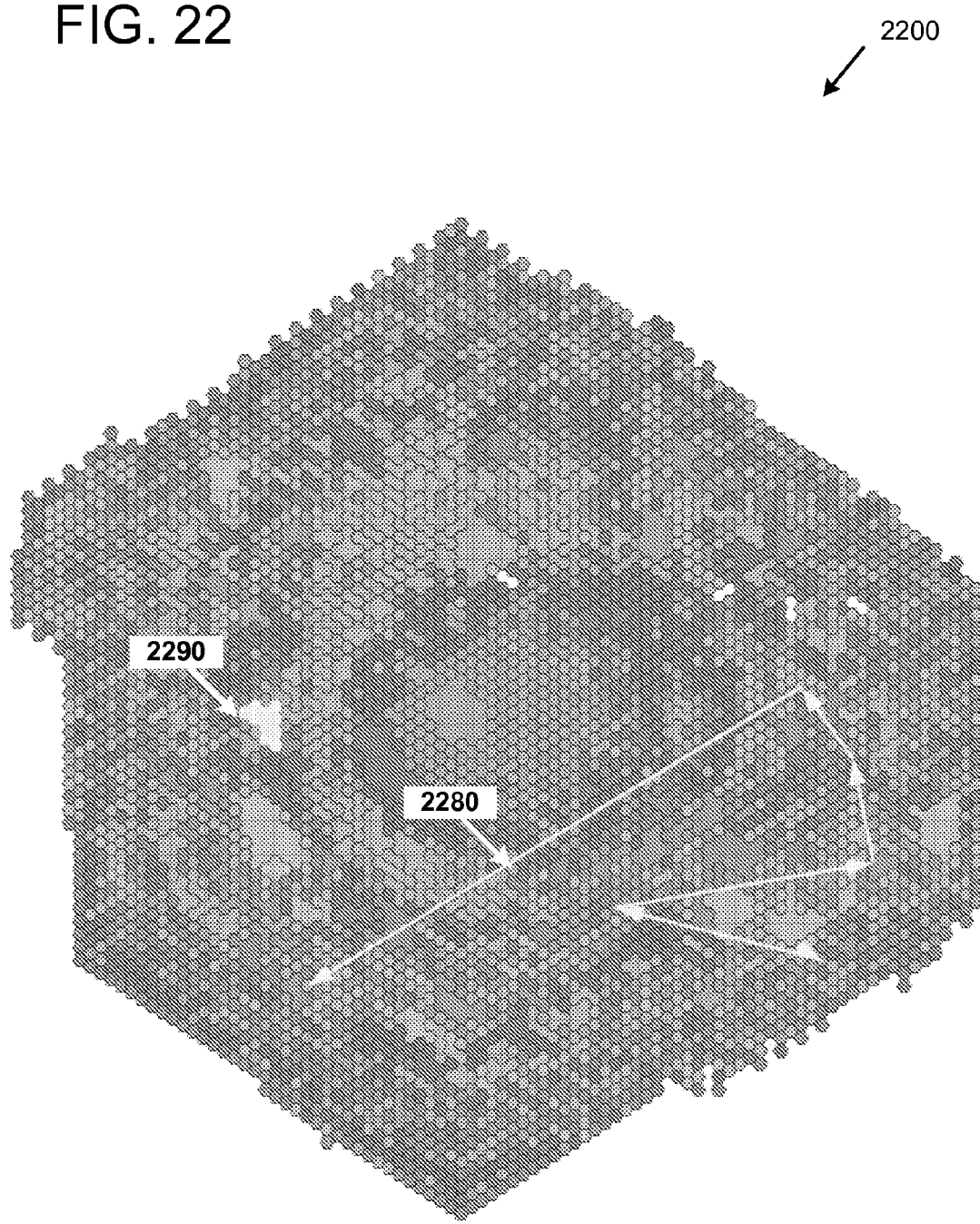
FIG. 22 shows an exemplary software map.

FIG. 22 shows an exemplary software map 2200 constructed via the techniques described herein. In the example, each of the 3800 regions represents a method, with a size proportional to the method's textual size (e.g., one tile for every two lines of code). Each class has its own shade (e.g., of green). The highlighted method 2290 (e.g., yellow) is the one that the user is currently reading in the editor. The arrows 2280 show the program's execution path up to the current debugger breakpoint.

Because the map can resemble a geographic map of terrain, it is sometimes called a "software terrain map." The software components as depicted in the map can thus be called "terrain features."

EXAMPLE 34

Navigation to Source Code

In any of the examples herein, selection or indication of an area of the map (e.g., by clicking on it) can result in navigation to the corresponding location in source code (e.g., to the corresponding method). So, for example, responsive to receiving a user activation while indicating a chosen element in the software map, navigation to a location within the source code corresponding to the chosen element can be performed. Such a user activation can take the form of a mouse click. An element can be indicated as chosen by pointing to it with a graphical pointer. Navigation can be performed by a mapping tool, a source code presentation tool, or some combination thereof.

Navigation to the location can include displaying source code at the location (e.g., jumping to the location in source code in an editor).

EXAMPLE 35

Exemplary Software Maps

Figure 23A:
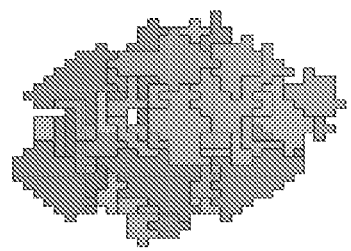
FIGS. 23A, 23B, and 23C show exemplary software maps.
Figure 23B:
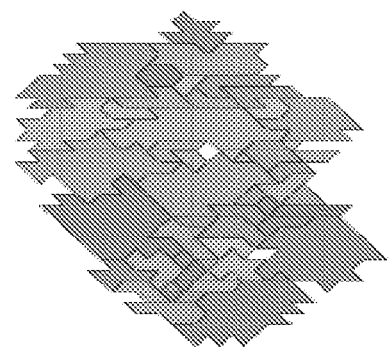
Figure 23C:
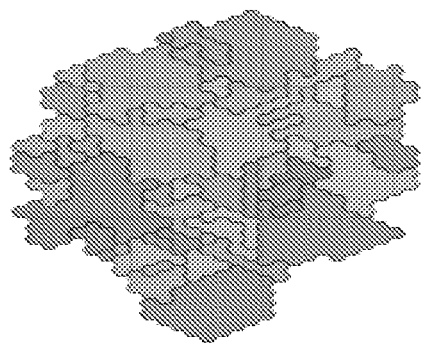
Figure 24A:
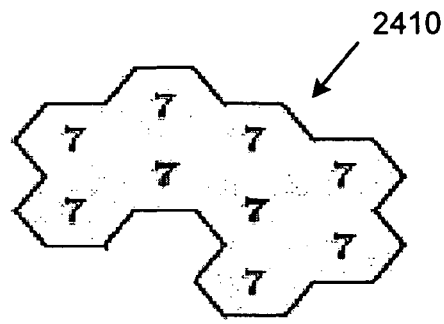
FIGS. 24A-24F illustrate an exemplary technique for placing elements in a map.
Figure 24B:
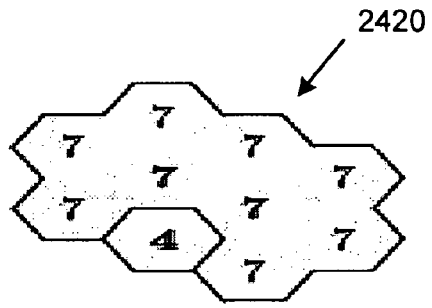
Figure 24C:
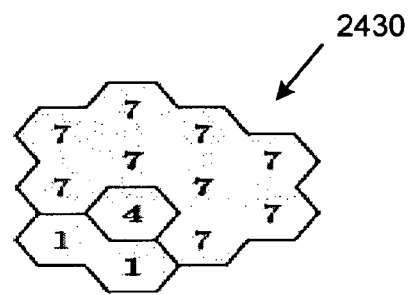
Figure 24D:
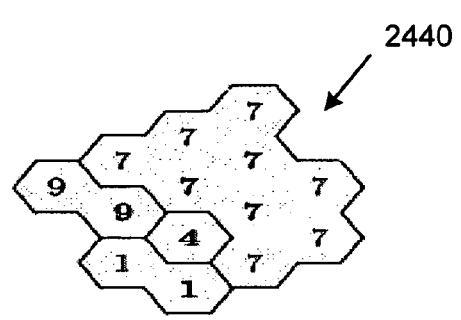
Figure 24E:
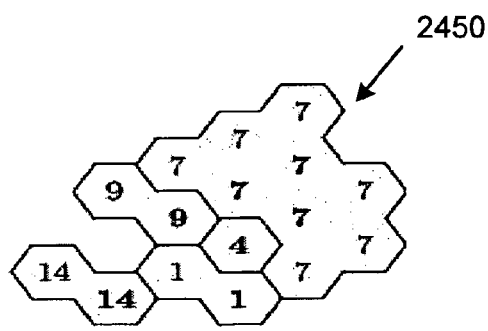
Figure 24F:
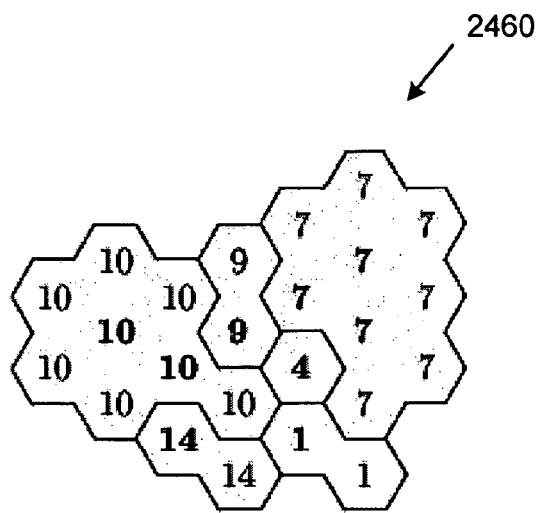

FIGS. 23A, 23B, and 23C show software maps for the same library built using three grid systems (e.g., tile shapes). 23A uses squares. 23B uses equilateral triangles, and 23C uses hexagons. Such techniques can be used with any of the examples described herein. In any of the examples, a single grid comprising identically shaped (e.g., having the same size and shape) grid elements can be used.

EXAMPLE 36

Exemplary Distance

In any of the examples herein, distance (e.g., between elements) can be determined in a number of ways. For example, when placing elements on the screen, the measure of screen distance (e.g., Euclidean or Manhattan) can be used (e.g., between centroids).

EXAMPLE 37

Exemplary Technique Employing Heuristics to Draw Map

A heuristic technique for minimizing (1) above can work in quadratic time. The technique can add each element to the map one at a time, spiraling outward from the center, and morphing the shape of previously added elements to improve their proximities to high-affinity elements. The morphing can be limited to keep the overall technique quadratic.

The technique can proceed in two phases. First, an order can be chosen to add the elements to the map. A variety of techniques for choosing order can be used. For example, methods can be sorted by each method's total affinity for the other methods. For each method m in a sorted list, m is added to the final ordering, then those methods reachable from m through a depth-first traversal of the program's call graph are added. At each stage of the depth-first traversal, the callees are explored in the order from highest to lowest total affinity.

Two other approaches are to use a breadth-first search of the call graph and to ignore the call graph altogether and simply use the list sorted by total affinity.

The second phase of the technique adds the elements to the map in the order that the first phase determines. For each element to be added, first identify the previously added element with the highest affinity for the new element (e.g., the "target"). The second phase attempts to get the new element as close as possible to the target, without using more than linear time to find a good position.

The second phase of the algorithm can be parameterized by the grid to be used (e.g., n-gon, such as triangle, square, or hexagon). A grid, as an abstract data type, supports a single operation: CoordinatesAtDistance(d, (x,y)) returns the set of grid coordinates at distance d from coordinate (x,y). The expression Neighbors(x,y) can be used to mean CoordinatesAtDistance (1, (x,y)).

To allow an element's shape to be morphed as new elements are added, each element is assigned two types of coordinates: an element's taken coordinates (e.g., grid element) are fixed (e.g., the taken coordinate can not be reassigned); a element's claimed coordinates can be exchanged for other coordinates. The algorithm maintains the following invariants (2), (3), and (4):

$$\text{Taken}(c) + \text{Claimed}(c) = \text{Size}(c) \quad (2)$$

(The number of an element's taken and claimed coordinates equals the component's size).

$$\forall (x,y) \in \text{Taken}(c) \cdot \exists (x',y') \in \text{Taken}(c) \cdot (x,y) \in \text{Neighbors}(x', y') \quad (3)$$

(The element's taken coordinates are all contiguous).

$$\forall (x,y) \in \text{Claimed}(c) \cdot \exists (x',y') \in \text{Taken}(c) \cdot (x,y) \in \text{Neighbors}(x',y') \quad (4)$$

(Every claimed coordinate is the neighbor of a taken coordinate).

Subject to these invariants, components (e.g., each component) can be assigned as few taken coordinates as possible because the more claimed coordinates a component has, the more flexible its shape, due to a process called claim renouncing (e.g., morphing) described below.

Table 1 shows pseudocode for the technique. Map elements are described as components in the code.

TABLE 1

Pseudocode for Technique

```
type Component :
  var grid : Grid;
  var layout : GridLayout;
  PlaceNear (target : Component) :
    for distance := 1 to MaxInteger :
      candidates := layout.CoordsAtDistance(distance, target);
      foreach coord in EmptyCoordinates(candidates, grid) :
        if this.PlaceAt(coord) : return;
      foreach coord in ClaimedCoordinates(candidates, grid) :
        if this.PlaceAt(coord) : return;
  end PlaceNear
  PlaceAt (start: Coord) : bool
    grid.BeginTransaction( );
    if grid.Claimed(start) ∧¬grid.Claimant(start).Renounce(start,{ },MAX)
      grid.AbortTransaction( )
      return false;
    grid.Take(this, start);
    placesToExpand := new Queue<Coord>;
    placesToExpand.Enqueue(start);
```

TABLE 1-continued

Pseudocode for Technique

```
    while ¬this.CompletelyInGrid(grid) ∧placesToExpand.Count > 0
      placeToExpand := placesToExpand.Dequeue( );
      expanded := false;
      foreach c in grid.Neighbors(placeToExpand)
        if grid.IsEmpty(c) ∨
          grid.IsClaimed(c) ∧grid.Claimant(c).Renounce(c, {c}, MAX)
          expanded := true;
          grid.Claim(c, this);
          placesToExpand.Enqueue(c);
      if expanded ∧this = grid.Claimant(placeToExpand)
        grid.Take (placeToExpand, this);
      if this.CompletelyInGrid(grid)
        grid.CommitTransaction( );
        return true;
      else
        grid.AbortTransaction( );
        return false;
  end Place
  Renounce (toRenounce: Coord, forbidden: Set<Coord>, limit: int) : bool
    if limit = 0 : return false;
    othersClaims := { };
    foreach takenCoord in grid.TakenSet(this)
      foreach c in layout.Neighbors(takenCoord) \ forbidden
        if grid.IsEmpty(c)
          grid.Unclaim(toRenounce, this);
          grid.Claim(c, this);
          return true;
        else if grid.IsClaimed(c) ∧this ≠ grid.Claimant(c)
          othersClaims.Add(c);
      foreach c in othersClaims
        if grid.Claimant(c).Renounce(c, forbidden ∪ {c}, limit−1)
          grid.Unclaim(toRenounce, this);
          grid.Claim(c, this);
          return true;
      foreach cl in grid.Claimed(this) \ forbidden
        foreach c in layout.Neighbors(cl) \ forbidden
          if grid.IsEmpty(c) ∨
            grid.IsClaimed(c) ∧
              grid.Claimant(c).Renounce(c, forbidden ∪ {c,cl}, limit−1)
            grid.Take(cl, this);
            grid.Unclaim(toRenounce, this);
            grid.Claim(c, this);
            return true;
      return false;
    end Renounce
  end Component
  type Terrain :
    SolveLayout (comps: List<Component>, layout: GridLayout) :
      target := new Map<Component,Component>;
      for i := 0 to size(comps)−1 :
        target[comps[i]] := CompWithMaxAffinity(Sublist(comps,0,i));
      grid := new GridState
      foreach comp in comps :
        comp.layout := layout;
        comp.grid := grid;
        comp.PlaceNear(target[comp]);
    end SolveLayout
  end Terrain
```

For elements (e.g., each element) to be added, the technique begins looking at distance 1 from the target and proceeds to greater distances until enough room for the new element has been found. For a given distance, we first divide the coordinates at that distance into the empty ones (the ones that no element has claimed or taken) and the claimed ones. We first consider each empty space in turn as a possible root for adding the new element, turning to the claimed ones only if there are no suitable empty ones. At each root, we search for enough coordinates to assign to the element to make up its size. If we cannot find enough coordinates at that root, any state changes made to the grid are abandoned and we try the next candidate root.

To search for coordinates from a root coordinate, the element first takes the root coordinate. To find each additional coordinate needed, we search among the direct neighbors (coordinates at distance 1) of the element's taken and claimed coordinates. The element can grow to include a neighboring coordinate either if the coordinate is empty or if the coordinate is claimed by another element willing to renounce its claim (as described below).

When the element finds a candidate neighboring coordinate, it claims it. If this newly claimed coordinate is a direct neighbor of one of the element's taken coordinates, the invariants are maintained and the algorithm can continue the search. However, if the newly claimed coordinate is a direct neighbor only of the element's claimed coordinates, then invariant (4) is violated. To re-establish the invariant, we convert one of the claimed coordinates to a taken coordinate and then continue the search.

For an element to renounce its claim on a coordinate, it finds a replacement coordinate to claim instead. The search for the replacement is exactly as described in the previous two paragraphs, with two exceptions. First, it keeps track of the coordinate being renounced so that the search for a replacement does not end up finding the one to be renounced. In fact, because the search for a replacement can cause neighboring elements to try to renounce their own claims, all coordinates being renounced are tracked. Otherwise, there can be cycles of neighboring elements fruitlessly swapping renounced coordinates.

Finally, the recursive process of neighbors renouncing claimed coordinates is limited by a constant bound to ensure the question of whether an element may have a given coordinate can be answered in constant time.

FIG. 24 illustrates the process with six elements added to a grid in successive maps 2410, 2420, 2430, 2440, 2450, and 2460. The elements are identified with a number, and an element's coordinates are labeled with its number. Claimed coordinates are shown in lightface; taken coordinates are shown in boldface. The first three elements are added by taking empty coordinates. To add element #9 (of size 2), which has the highest affinity for element #4, element #7 renounces one of its claimed coordinates (e.g., it morphs), so that #9 may have it. Similarly, in 24F, to add element #10, element #7 renounces a claimed coordinate to allow #9 to renounces one of its claimed coordinates so that #10 may have it. As the figure shows, the ability to renounce claimed coordinates allows elements to get closer to their targets than they would if we were to use a pure greedy approach (e.g., all elements are taken).

EXAMPLE 38

Exemplary Integration

Any of the technologies described herein can be integrated into a software development environment (e.g., the MICROSOFT VISUAL STUDIO software).

EXAMPLE 39

Exemplary Overlays

Figure 25:
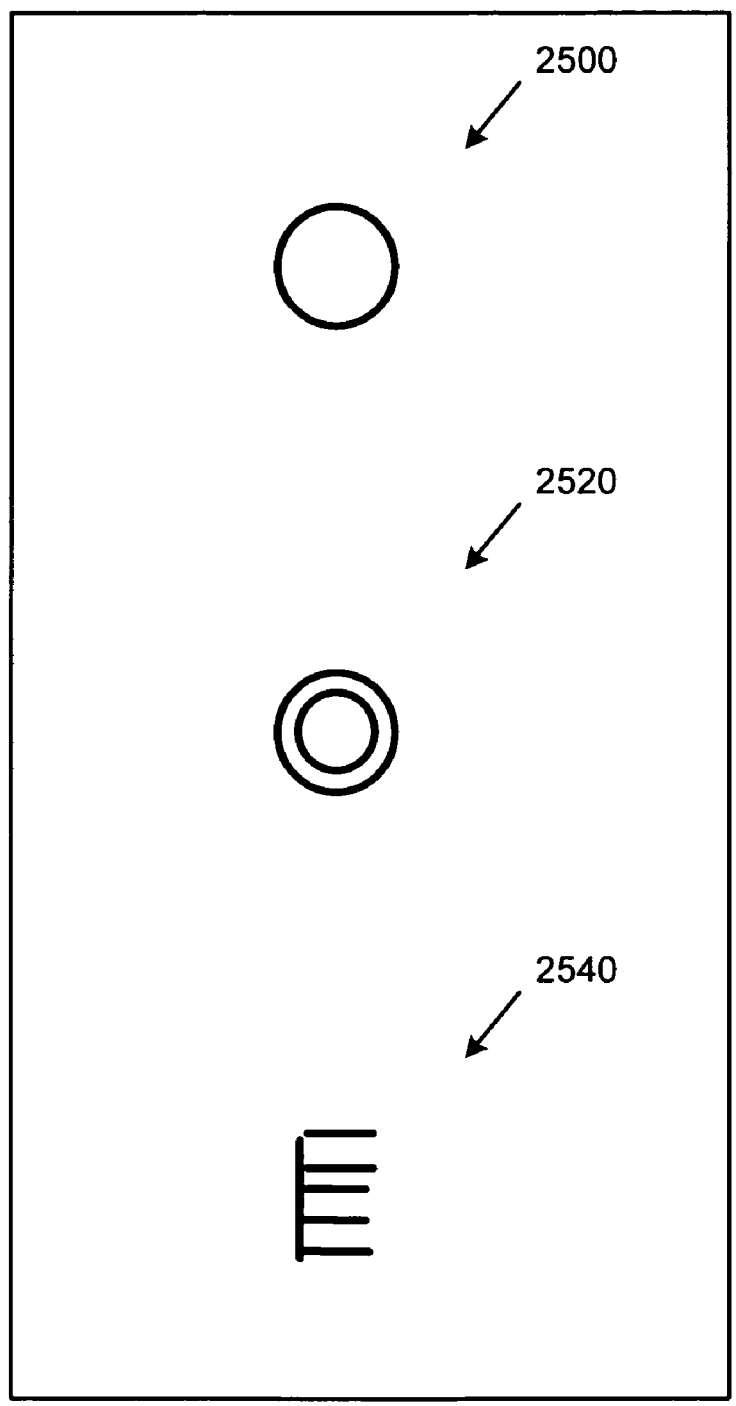
FIG. 25 shows exemplary icons for placement on a map.

In any of the examples herein, information of any nature can be overlaid on a map. For example, icons can be placed on the map. For example, based on a method's control structure (e.g., loop, nested loop, switch statement), a different icon can be used. FIG. 25 shows exemplary symbols (e.g., for a loop 2500, a nested loop 2520, and a switch statement 2540).

Such icons can be placed with or adjacent to methods containing the indicated control structure.

EXAMPLE 40

Handling Additions

In any of the examples herein, additions to the software program can be handled in a variety of ways. For example, the map can be redrawn.

Or, new methods can be placed off to the side, ignoring the new methods' affinities, until the developer (or the team) is ready for a map change.

For methods that grow in size, the changes can be ignored until the developer (or the team) is ready for a map change.

EXAMPLE 41

Exemplary Deleted Elements

In any of the examples described herein, an element may become deleted for some reason. For example, if the source code for a component is deleted, the corresponding map element can be removed. Rather than rearranging the map, it may be desirable to simply indicate the element as deleted (e.g., by displaying a blank area or the like). Exemplary deletions are shown in FIG. 22 as empty hexes in the grid.

EXAMPLE 42

Exemplary System Using Printed Maps

In any of the examples described herein, a map may be printed. For example, a printed map can be displayed to illustrate the current progress of a software development project. Such printed versions can be archived for later comparison.

Also, a printed version of the map can be placed in a position so that a projector can be used to display additional information on the map (e.g., to emphasize certain areas of the map).

EXAMPLE 43

Exemplary Rivers

In any of the examples herein, a depiction of multiple paths can be shown on the map. For example, information about various paths between software components can be received (e.g., via profiling an execution of the software). The width of a path can be weighted based on the number of observations. So, for example, if a path is observed a greater number of times, its width can be greater. Paths may overlap.

Portrayal of such paths may resemble a river on the map. Such a feature on the map can help a viewer by providing a recognizable landmark on the map. For example, some elements will be close to the river (e.g., at its widest point), while others may not be close to it.

EXAMPLE 44

Exemplary Design Goals

In any of the examples herein, any of the following techniques can be used.

A display can show the entire program. In such a case, whatever a user navigates to (e.g., in an editor) can have a representation in the display. Thus, elision or abstraction need not be used.

The display can contain enough visual landmarks to allow a user to find parts of the program perceptually (e.g., based on shape), rather than relying on names. For example, when finding Rome on a map of Europe, Italy can be quickly found via its famous boot shape rather than reading for the word "Italy." Similarly, the map can contain differentiable shapes for map elements.

The map can remain visually stable as the user navigates. The map's content and perspective need not change when a user navigates around in the program's text.

Global program information can be displayed. For example, execution paths can be shown (e.g., show the call stack when an exception is raised or the hot path that a profiler reports). Also, development team awareness data can be depicted, such as which developers are currently working on which parts of the program.

Software maps can be displayed in a number of ways, such as behind the text in an editor window or in a second monitor. An emphasized (e.g., highlighted) area on the map can continuously update to show the part that the user is currently reviewing (e.g., editing).

A Voronoi diagram can be drawn around locations for the map elements.

EXAMPLE 45

Exemplary Computing Environment

Figure 26:
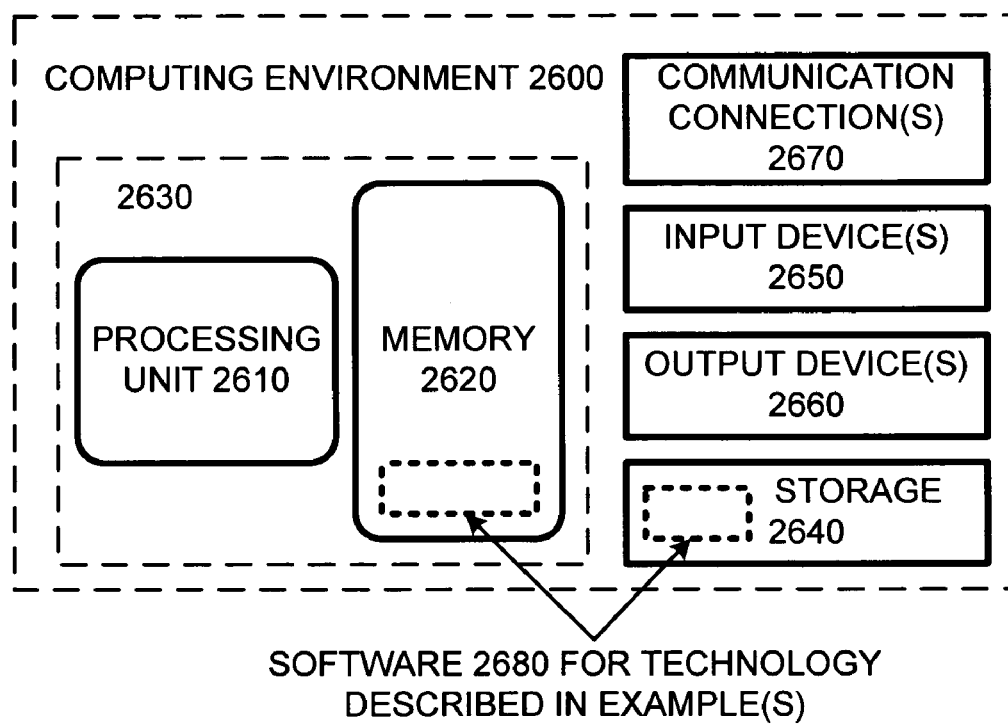
FIG. 26 is a block diagram of an exemplary suitable computing environment for implementing described implementations.

FIG. 26 illustrates a generalized example of a suitable computing environment 2600 in which the described techniques can be implemented. The computing environment 2600 is not intended to suggest any limitation as to scope of use or functionality, as the technologies may be implemented in diverse general-purpose or special-purpose computing environments.

With reference to FIG. 26, the computing environment 2600 includes at least one processing unit 2610 and memory 2620. In FIG. 26, this most basic configuration 2630 is included within a dashed line. The processing unit 2610 executes computer-executable instructions and may be a real or a virtual processor. In a multi-processing system, multiple processing units execute computer-executable instructions to increase processing power. The memory 2620 may be volatile memory (e.g., registers, cache, RAM), non-volatile memory (e.g., ROM, EEPROM, flash memory, etc.), or some combination of the two. The memory 2620 can store software 2680 implementing any of the technologies described herein.

A computing environment may have additional features. For example, the computing environment 2600 includes storage 2640, one or more input devices 2650, one or more output devices 2660, and one or more communication connections 2670. An interconnection mechanism (not shown) such as a bus, controller, or network interconnects the components of the computing environment 2600. Typically, operating system software (not shown) provides an operating environment for other software executing in the computing environment 2600, and coordinates activities of the components of the computing environment 2600.

The storage 2640 may be removable or non-removable, and includes magnetic disks, magnetic tapes or cassettes, CD-ROMs, CD-RWs, DVDs, or any other computer-readable media which can be used to store information and which can be accessed within the computing environment 2600. The storage 2640 can store software 2680 containing instructions for any of the technologies described herein.

The input device(s) 2650 may be a touch input device such as a keyboard, mouse, pen, or trackball, a voice input device, a scanning device, or another device that provides input to the computing environment 2600. For audio, the input device(s) 2650 may be a sound card or similar device that accepts audio input in analog or digital form, or a CD-ROM reader that provides audio samples to the computing environment. The output device(s) 2660 may be a display, printer, speaker, CD-writer, or another device that provides output from the computing environment 2600.

The communication connection(s) 2670 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Communication media can embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the above can also be included within the scope of computer readable media.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Methods in Computer-executable Media

Any of the methods described herein can be implemented by computer-executable instructions in one or more computer-readable media (e.g., computer-readable storage media).

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. I therefore claim as my invention all that comes within the scope and spirit of these claims.

I claim:

1. One or more computer-readable storage media comprising computer-executable instructions for performing a method comprising:

for a software program comprising a plurality of software components, receiving an indication of affinity between at least two of the software components;

for the software components, generating respective map elements representing the software components;

placing the map elements within a map representing the software program based on the affinity; and displaying the map representing the software program;

wherein the placing comprises:

placing map elements representing the software components (C) in the map at respective locations via a heuristic configured to minimize $$\sum_{(c_1, c_2) \in C} \text{Affinity}(c_1, c_2) \times \text{Distance}(c_1, c_2);$$

wherein Affinity ($c_1$, $c_2$) comprises an affinity between two software components $c_1$ and $c_2$ out of the software components C, and Distance($c_1$, $c_2$) comprises a distance between map elements representing the two software components $c_1$ and $c_2$.

2. The one or more computer-readable media of claim 1 wherein placing the map elements places at least one contiguous map element directly neighboring an other element already in the map.

3. The one or more computer-readable media of claim 1 wherein:

the software components comprise methods; and the affinity is based on presence of calls to and from the methods in source code.

4. The one or more computer-readable media of claim 1 wherein the affinity is based on observed calls to methods during an observed execution of the software program.

5. The one or more computer-readable media of claim 1 wherein the method further comprises:

determining a current location within the program to which navigation has occurred in source code for the program; and indicating within the map the current location.

6. The one or more computer-readable media of claim 5 wherein the indicating indicates within an element of the map corresponding to a software component of the current location.

7. The one or more computer-readable media of claim 1 wherein the method further comprises:

receiving an indication of a path among the software components; and drawing on the map a representation of the path among the software components as a path among map elements corresponding to the software components.

8. The one or more computer-readable media of claim 1 wherein the method further comprises:

receiving an indication of subset membership for the software components; and drawing on the map at map elements a representation of the subset membership for the software components corresponding to the map elements.

9. The one or more computer-readable media of claim 1 wherein the method further comprises:

receiving an indication of a magnitude for at least one of the software components;

wherein the generating generates a map element for the at least one of the software components of a size corresponding to the magnitude of the at least one of the software components.

10. The one or more computer-readable media of claim 9 wherein the magnitude is based on size of the at least one of the software components.

11. The one or more computer-readable media of claim 1 wherein the placing comprises:

morphing at least one map element already placed in the map to accommodate a new map element being placed in the map.

12. A method comprising:

storing a map representing a software program, wherein the map comprises a plurality of map elements corresponding to respective software components of the software program, and the map elements corresponding to the respective software components (C) are placed in the map at respective locations via a heuristic configured to minimize $$\sum_{(c_1, c_2) \in C} \text{Affinity}(c_1, c_2) \times \text{Distance}(c_1, c_2);$$

wherein Affinity ($c_1$, $c_2$) comprises an affinity between two software components $c_1$ and $c_2$ out of the software components C, and Distance($c_1$, $c_2$) comprises a distance between map elements representing the two software components $c_1$ and $c_2$; and displaying the map;

wherein the plurality of map elements are placed on a single grid comprising identically shaped grid elements;

wherein a number of grid elements for respective map elements is determined based on a metric for the software components corresponding to the respective map elements;

wherein the map elements are depicted as respective single contiguous geometric shapes;

wherein at least two of the map elements have different shapes;

during browsing of source code of the software program by a user and during display of an excerpt of the source code of the software program for viewing by a user, determining, by a computer, a current location within the source code of the software program to which navigation has occurred during browsing by the user;

indicating within the map the current location within the source code of the software program to which navigation has occurred during browsing of the source code by the user; and displaying, on the map representing the software program, a path indicating navigation during browsing of the source code by the user.

13. The method of claim 12 wherein:

at least one relationship between the software components is represented by the map via arrangement of the respective map elements within the map.

14. The method of claim 12 wherein the metric for the software components comprises a size of source code for the software components.

15. The method of claim 12 wherein the metric for the software components comprises a measure of complexity of the software components.

16. The method of claim 13 wherein the at least one relationship comprises a measure of affinity between two software components.

17. One or more computer-readable storage media comprising computer-executable instructions for performing a method comprising:
- during browsing of source code of a software program comprising a plurality of components by a user and during display of an excerpt of source code of the software program comprising the plurality of components for viewing by the user, for the software program comprising the plurality of components, receiving an indication of to which component within the source code of the software program navigation has occurred based on a cursor location within text in a window;
- for a software terrain map representing the software program, wherein the software terrain map has a plurality of terrain features representing a plurality of respective components of the software program, indicating where on the software terrain map navigation within the source code of the software program has occurred via visually emphasizing one of the terrain features for a respective component to which navigation has occurred; and
- displaying, on the software terrain map, a path indicating previous locations from which navigation within the source code has occurred;
- wherein terrain features representing the respective components (C) in the map are placed at respective locations via a heuristic configured to minimize $$\sum_{(c_1, c_2) \in C} \text{Affinity}(c_1, c_2) \times \text{Distance}(c_1, c_2);$$

wherein Affinity $(c_1, c_2)$ comprises an affinity between two components $c_1$ and $c_2$ out of the components C, and Distance$(c_1, c_2)$ comprises a distance between terrain features representing the two components $c_1$ and $c_2$.

18. The one or more computer-readable media of claim 17 wherein the method further comprises:
- responsive to receiving a user activation while indicating a chosen element in the software terrain map, navigating to a location within source code corresponding to the chosen element.

* * * * *

UNITED STATES PATENT AND TRADEMARK OFFICE
CERTIFICATE OF CORRECTION

| | |
|---|---|
| PATENT NO. | : 7,614,035 B2 |
| APPLICATION NO. | : 11/266922 |
| DATED | : November 3, 2009 |
| INVENTOR(S) | : Robert A. DeLine |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1034 days.

Signed and Sealed this

Nineteenth Day of October, 2010

David J. Kappos
*Director of the United States Patent and Trademark Office*